United States Patent
Fukushima

[15] 3,658,414
[45] Apr. 25, 1972

[54] PROJECTOR FOR IMAGES FORMED BY COMPOUND PHOTOGRAPHY

[72] Inventor: Yoshio Fukushima, Tokyo, Japan
[73] Assignee: Kabushiki Kaisha Ricoh, Tokyo, Japan
[22] Filed: Dec. 2, 1969
[21] Appl. No.: 881,561

[30] Foreign Application Priority Data
Dec. 10, 1968 Japan..................................43/90744

[52] U.S. Cl....................................353/30, 353/25, 353/38
[51] Int. Cl.................................G03b 21/26, G03b 23/02
[58] Field of Search..................353/32, 25, 30, 38, 95, 114; 350/167; 352/81

[56] References Cited
UNITED STATES PATENTS
2,950,644  8/1960  Land et al................................352/81
2,543,520  2/1951  Bradford et al........................353/114

Primary Examiner—Leonard Forman
Assistant Examiner—Steven L. Stephan
Attorney—Burgess, Ryan and Wayne

[57] ABSTRACT

A device for projecting upon a screen the images formed and recorded by the compound photographic camera which comprises a first lens directed toward a subject, an aperture movable in a plane within said first lens or in the vicinity thereof and at a right angle relative to the optical axis thereof and a microlens group disposed behind a plane upon which an image in the air is formed through said first lens, whereby said image is further split into finely divided images and recorded upon a sensitized material disposed behind said microlens group and a plurality of images of other subjects are recorded upon said sensitized material in the same manner as described above.

3 Claims, 58 Drawing Figures

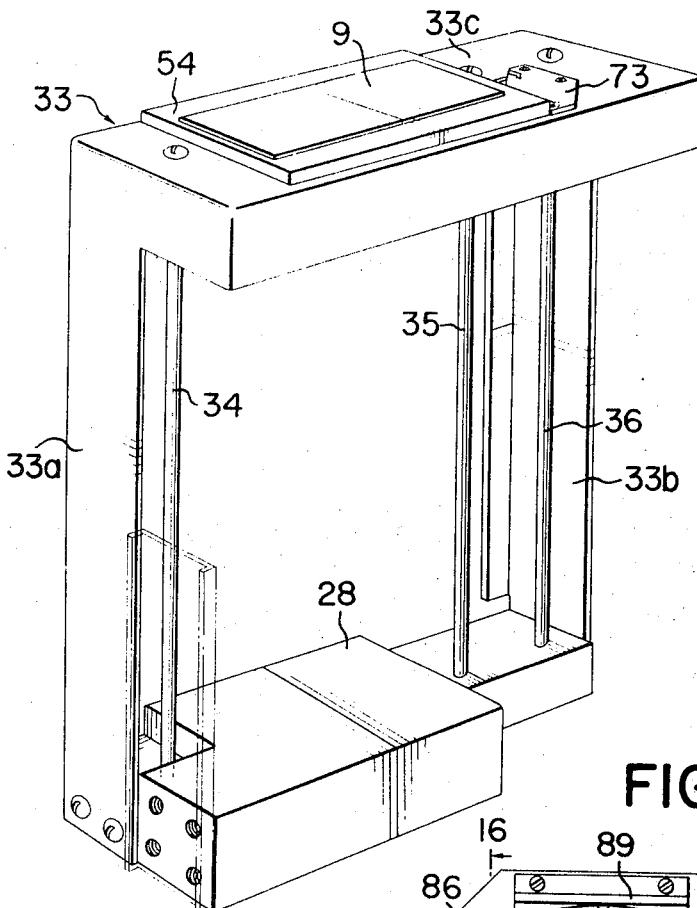
FIG. 12
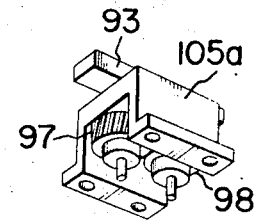
FIG. 15
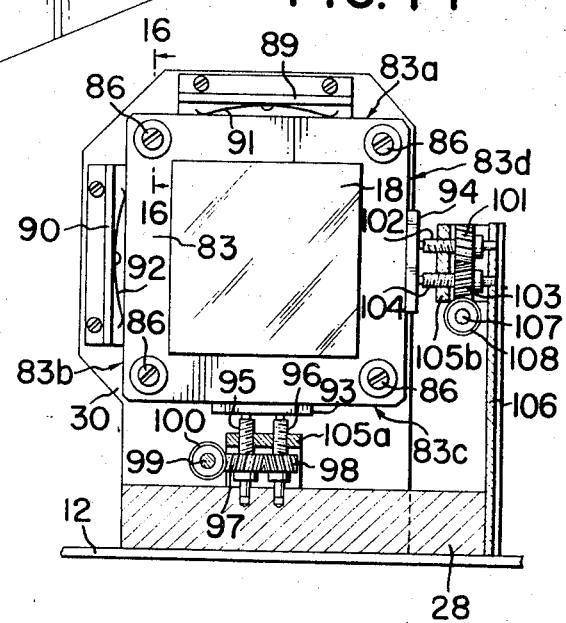
FIG. 14
FIG. 16

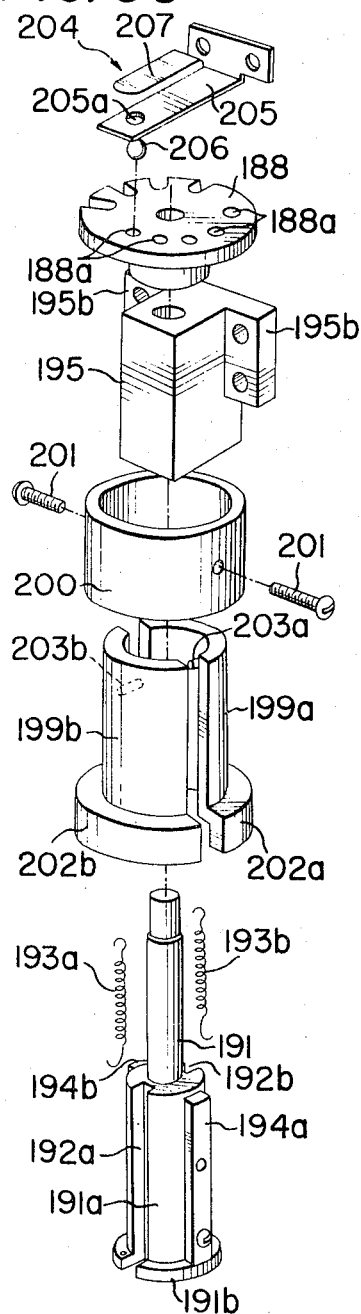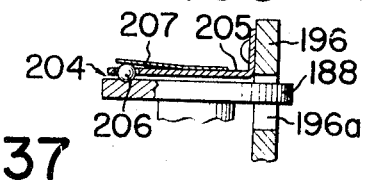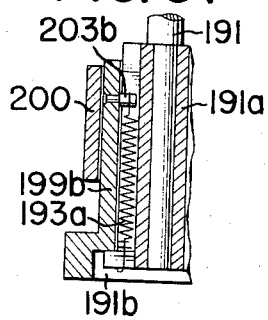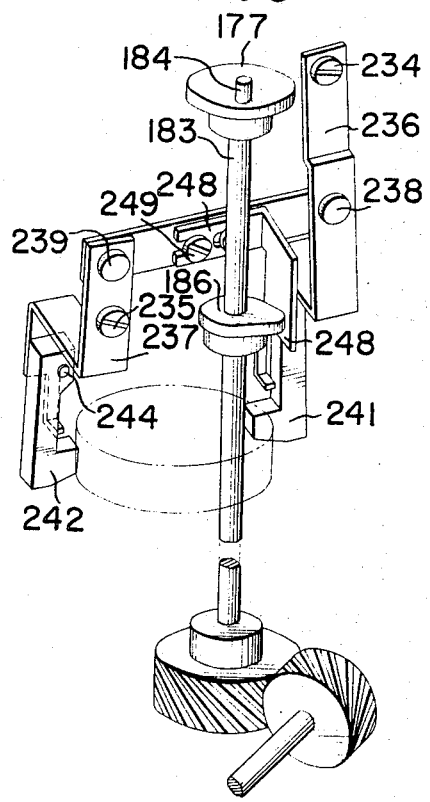

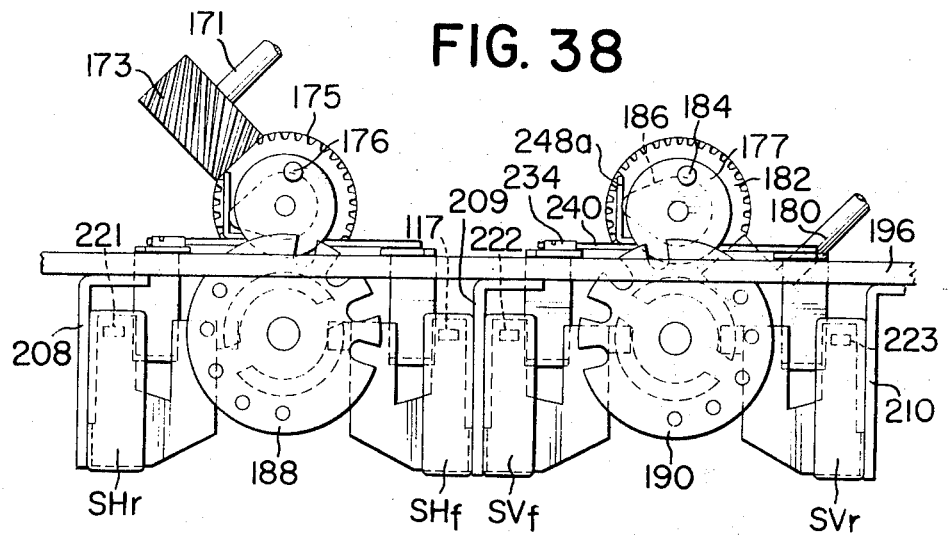
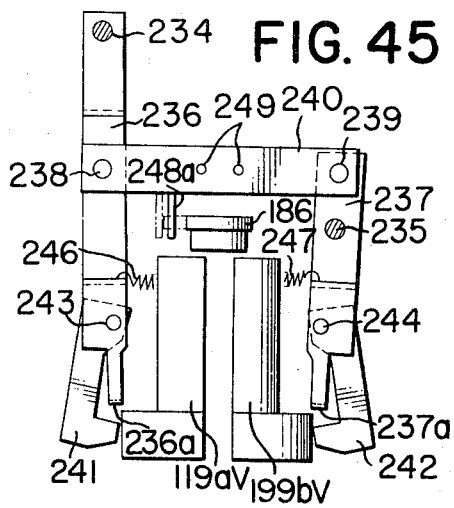
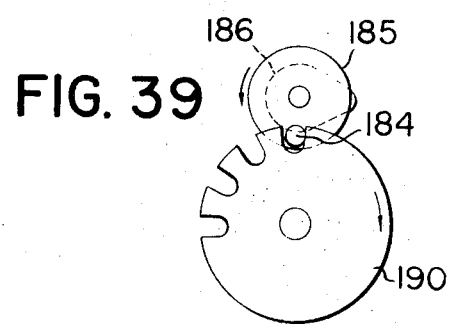
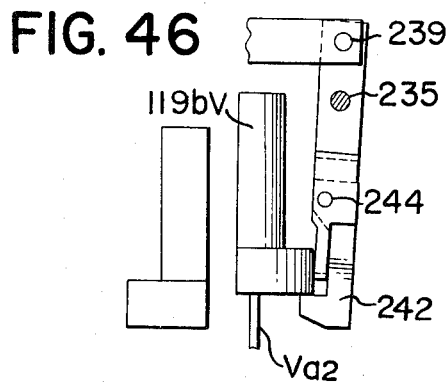
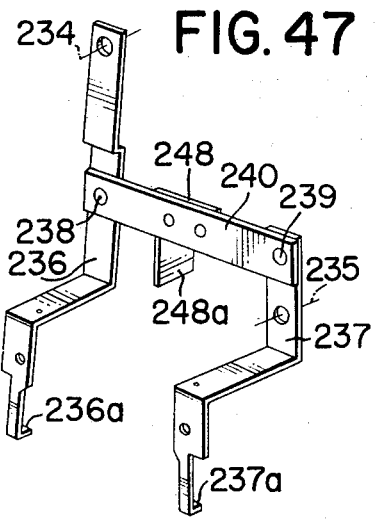

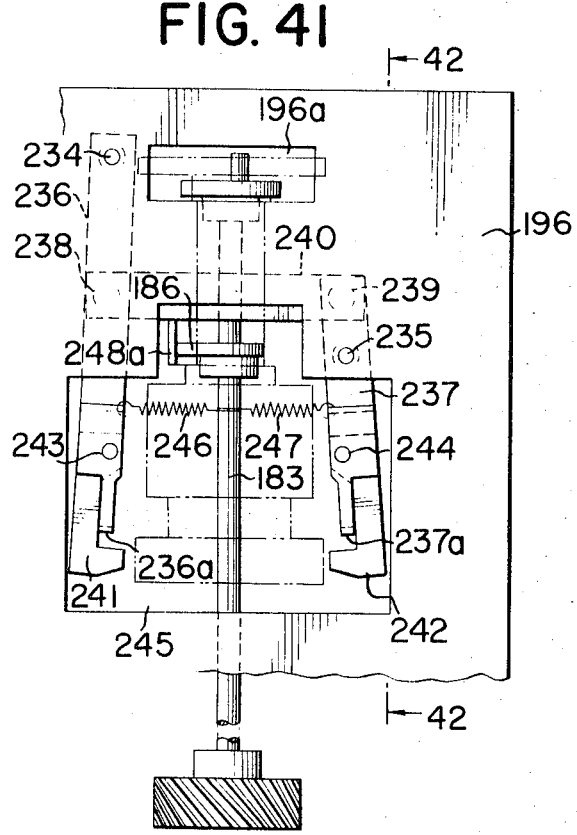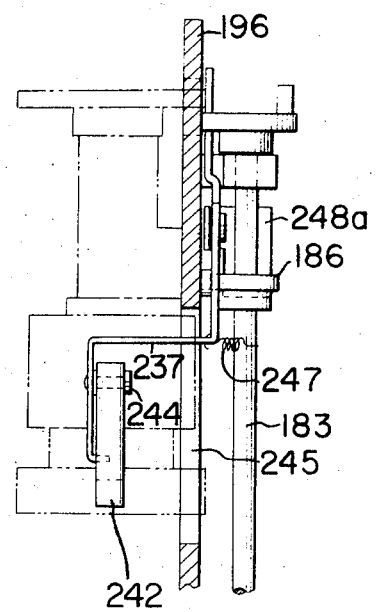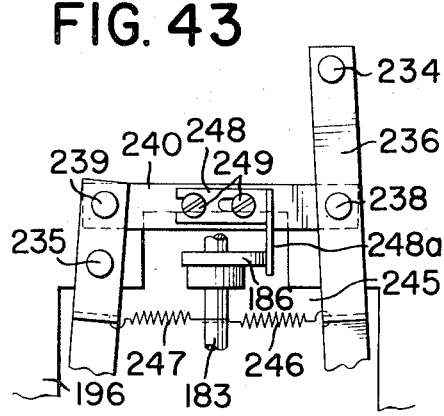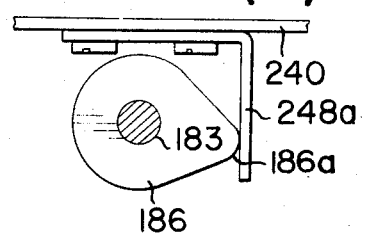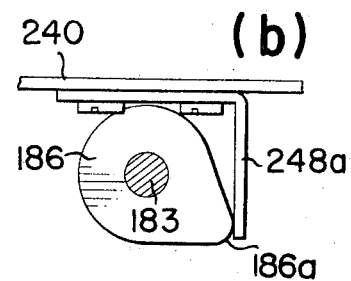

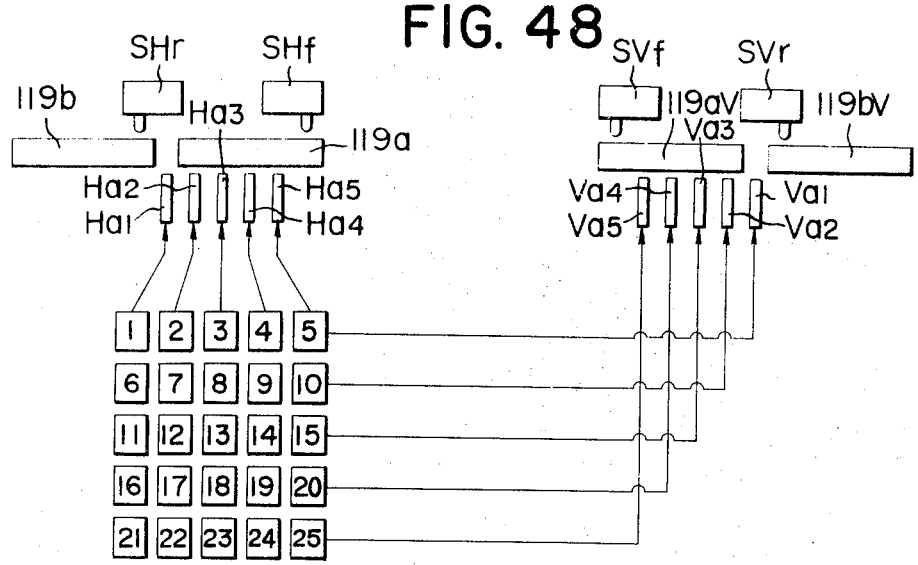
FIG. 48
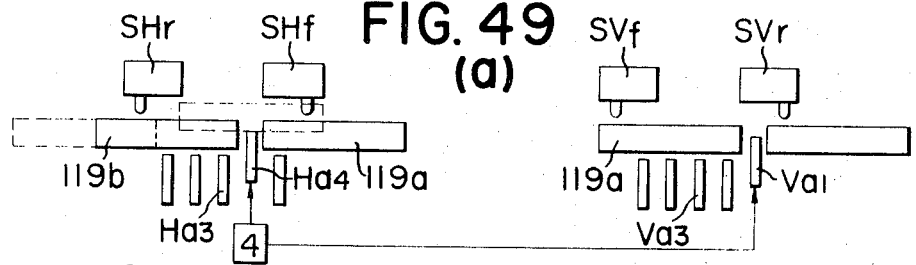
FIG. 49 (a)
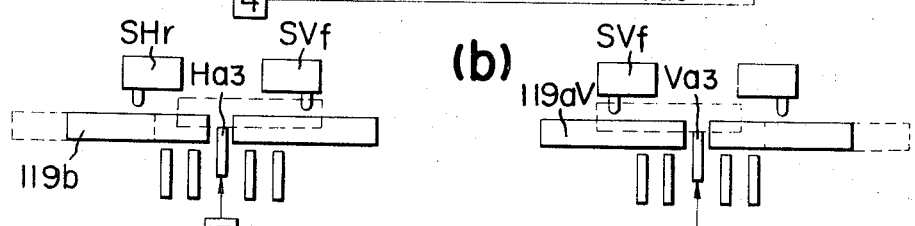
(b)
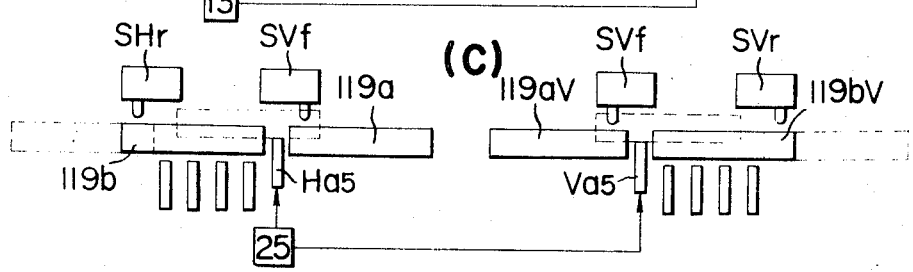
(c)

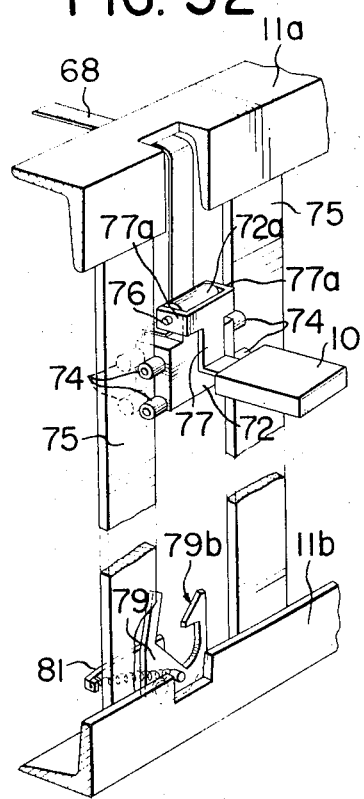
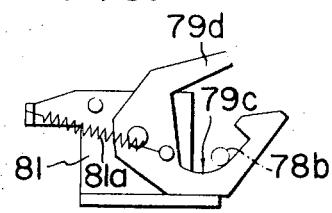
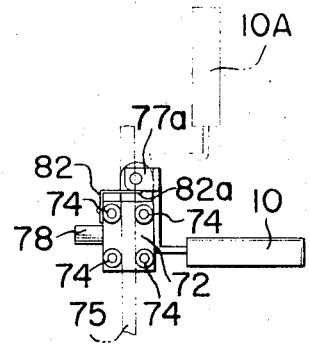
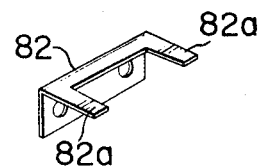

PROJECTOR FOR IMAGES FORMED BY COMPOUND PHOTOGRAPHY

BACKGROUND OF THE INVENTION:

The present invention relates to a compound photographic image projector and more particularly a device for projecting upon a screen each of a plurality of images which is finely split and recorded upon a single sensitized material or recording medium by the compound photography.

When the information is recorded upon the microfilm, it is sometimes required to ensure absolute secrecy of the information recorded. And it will be more advantageous that a plurality of information units are recorded upon a single recording medium.

In order to meet the above described demands, the inventors have developed a novel method and device for recording each of a plurality of subjects upon a single recording medium as finely split images.

The primary object of the present invention is to provide a device for projecting upon a screen each image of said plurality of subjects, said each image consisting of said finely split images recorded upon said single recording medium by the compound photography, so as to form a real image in such a manner that it may be viewed, photographed or otherwise observed.

SUMMARY OF THE INVENTION

The projector in accordance with the present invention so far described in detail hereinafter may be summarized as follows:

1. In the projector of the present invention is employed an "original" obtained by a compound photographic device comprising a first lens, a movable aperture 3 and a second lens consisting of a plurality of microlenses. The original may be integral with the second lens and detachably mounted in the projector. The projection lens of the projector is optically equivalent to the first lens and at the back of the projection lens is formed a movable aperture by the intersection of a pair of elongated slots arranged at right angles with respect to each other of a pair of horizontally and vertically movable plates which are moved horizontally and vertically in steps respectively in order to select an aperture through which a selected image may be projected. In the embodiment described hereinabove, the aperture plate 154 having the same number of apertures as that of subject images recorded upon the original is employed so that one of these apertures may be selected for projection by said pair of movable aperture plates. However, when the pair of these movable plates may be moved and stopped at a desired position at a higher degree of accuracy, the aperture plate 154 may be eliminated. In this case, the image may be selected directly by the movable aperture formed by the intersection of the elongated slots of the pair of movable plates.

The position of the movable aperture may be selected by the image selection assembly disposed at the front side of the projector. The movable plates for forming a movable aperture may be driven by a drive mechanism which is controlled by signals transmitted from the above image selection assembly and is interposed between this assembly and the pair of movable plates.

An illumination system is arranged at the back of the original and the finely split images upon the original may be projected on enlarged scale, upon a screen which is not required to be held in the housing of the projector. When the projection screen is spaced apart from the projection lens by a sufficient distance, a more enlarged image may be projected thereupon and it is desirable that the focusing may be accomplished from the exterior of the projector.

When it is desired to copy the projected image, a mirror-image-like will be obtained if a silver halide sensitized printing paper is placed upon the screen. Therefore, the projected housing 21 including the reflecting mirror 14 is removed from the projector and a printing paper may be set in front of the projection lens. Such copying operation will be facilitated when a printing paper setting device is mounted at the back portion of the projector and the projection lens is optically connected with the printing paper through a frustoconical light shielding cylinder. The shutter may be attached within the lens barrel, in front of the lens or any other suitable position for exposure.

2. The above described pair of movable plates are driven by drive shafts independently of each other. The drive shafts are rotated in both directions by the motors.

In the motor circuits, change-over switches for reversing the rotation of the motors are included and actuated in response to the image selection operation so that the movable plates may be moved to a predetermined position for forming an aperture at a predetermined position by the motors.

In order to stop or form a movable aperture at a predetermined position with a higher degree of accuracy, means for keeping the change-over switches closed is provided. In the instant embodiment, hooks are used in order to hold the switch actuating members in their operative positions in the switch actuating assemblies, but said means is not limited to such hooks.

The switch which has been closed by said switch operation retaining means is opened by the switch actuating members coupled to the drive shaft when the aperture is formed at the selected position.

The accuracy in operation of the projector of the present invention is attained by the provision of the pair of movable plates for forming a movable aperture, drive shafts each adapted to drive each of the plates independently of each other, motors for said drive shafts, motor rotation reversing switches in the motor circuits, means for keeping said switches closed and means for opening said switches at a predetermined time.

3. Said switch operation retaining means is provided with an engaging member which is caused to move by the cam carried by the shaft which in turn is rotated by said drive shaft. The cam serves to push or move the engaging member when the movable aperture is located at a predetermined position so as to open the switch. By suitably adjusting the position of the cam relative to the engaging member, the time when the switch is opened, that is the time when the motors are stopped and the movable aperture is located at a predetermined position, may be adjusted.

The accuracy in operation of the projector of the present invention is further improved by the provision of the adjustable engaging member described above. When the aperture plate is eliminated and the images to be projected is directly selected by the movable aperture, the function of said engaging member is very important.

4. The original holder mounting for an original is so arranged as to be extended beyond the projector. Upon operation of the knob in the outside of the projection device, the original holding member of the original holder is extended beyond the top plate of the projector. Therefore, in the projector of the present invention, the operation of drawing out the original holder from the projector by opening the top wall or the like may be eliminated, thus the operation is much facilitated.

In the embodiment described above, the original holder is coupled with the operation knob by means of flexible band, but it is easily understood that any other suitable means such as linkage, rack-and-pinion mechanism may be employed if desired.

5. In order to further facilitate the handling of the originals, the original holding portions arranged upon the original holder are automatically opened when the original holder is extended out of the projector because the original holding portions or members contact with the projections extended from the original holder mounting member when the original holder is moved upwardly so that the holding portions or members are automatically opened.

6. The movable microlens plate and mirrors are interposed between the original and the light source lamp. The microlens plate is adapted to move horizontally and vertically in a plane in parallel with the original, whereas the movable mirror is adapted to rotate about both of the horizontal and vertical axes. Both of the movable microlens plate and the movable mirror are coupled to both of the drive shafts so that when the movable aperture is located at a predetermined position, the movable mirror is rotated and the microlens plate is moved, whereby the movable aperture and the light source lamp may be located symmetrically with respect to the center of the original.

A slider which is caused to move in response to the depression of the pushbuttons arrayed in said image selection assembly may be so arranged as to be actuated by cams on a rotatable operation member so that the movable aperture may sequentially and successively move in stepwise order, thereby the moving images are projected upon the projection screen.

BRIEF DESCRIPTION OF THE DRAWING:

FIG. 12 is a perspective view of an original holder mounting member for vertically movably mounting said original holder;

FIG. 14 is a sectional view taken along the line 14—14 of FIG. 6;

FIG. 15 is a perspective view of a microlens plate pressure means for slight movement of the microlens plate for illuminating the original;

FIG. 16 is a sectional view on enlarged scale taken along the line 16—16 of FIG. 14;

FIG. 35 is an exploded view of the assembly of FIG. 31;

FIG. 36 is a fragmentary sectional view of a click-stop assembly incorporated in said switch actuating assembly;

FIG. 37 is a sectional view of the switch actuating assembly;

FIG. 38 is a plan view of the switch control system;

FIG. 39 is a plan view illustrating only the intermittent rotary means thereof;

FIG. 40 is a perspective view of means for retaining said switch actuating assembly in its operative position;

FIG. 41 is a front view of the means of FIG. 40;

FIG. 42 is a sectional view taken along the line 42—42 of FIG. 41;

FIG. 43 is a rear view thereof illustrating release timing adjustment means;

FIG. 44 (a) and (b) are views of said release timing adjustment means;

FIG. 45 is a front view illustrating the relation between said retaining means and said switch pressure member;

FIG. 46 is a fragmentary front view illustrating the engaging member of said operation retaining means holding the switch actuating member in its operative position;

FIG. 47 is a perspective view of a linkage for the means of FIG. 46;

FIG. 48 is for explanation of the image selection assembly;

FIGS. 49 (a) – 49 (c) are explanations of the operation of the assembly of FIG. 48;

FIG. 52 is a perspective view of the means in FIG. 51;

FIG. 53 is a front view illustrating lock means for the assembly of FIG. 51;

FIG. 54 is a side view illustrating the operation knob for the assembly of FIG. 51; and FIG. 55 is a perspective view illustrating only a plate spring used for positioning the knob of FIG. 54.

DESCRIPTION OF THE PREFERRED EMBODIMENT:

The present invention relates to a projector for projecting an image formed by compound photography, said image consisting of a plurality of finely split images each recorded upon a predetermined position of a sensitized material, which records thereupon also a plurality of subject images as finely split images which are distributed all over the surface of the sensitized material so as not to overlap one upon another, a plurality of finely split images belonging to one subject image being reproduced and projected upon a projection screen as one synthetized image.

Figure 1:
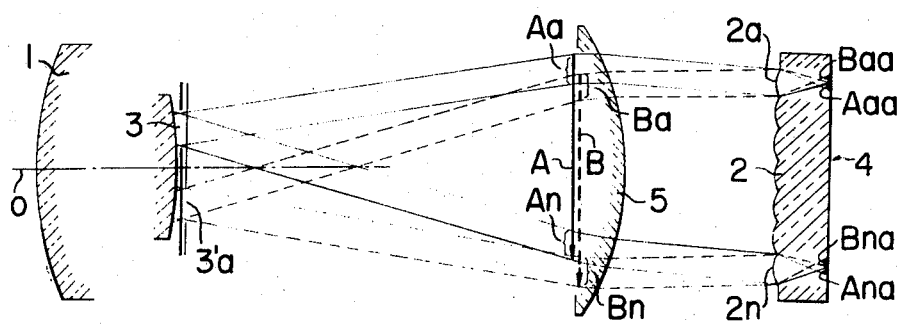
FIG. 1 is for explanation of an optical system used in a compound photography.

Prior to the description of the projector of the present invention, the principle of compound photography will be described hereinafter. The optical system is shown in FIG. 1 and comprises a first lens 1 having a relatively large diameter, a second lens 2 and an aperture 3 arranged backwardly of the first lens 1. The second lens 2 is comprised of a plurality of microlenses arrayed in column and row so as to split an inverted image formed by the first lens 1 in the air into a plurality of split images and focus them upon a sensitized material 4 as upright or erect images. The aperture 3 is adapted to displace in a plane perpendicular to the optical axis 0 of the first lens 1 horizontally and vertically and serves to determine the positions upon the sensitized material 4 of the split images of the inverted image formed by the first lens 1 and focused through the microlens of the second lens 2.

The same effect can be accomplished when the aperture 3 is disposed immediately before or within the first lens 1 or behind the second lens 2. As to the sensitized material 4 disposed behind the second lens 2, it may be positioned on any plane as far as this plane is the focusing plane of the second lens. For example, the sensitized material 4 may be placed upon the rear surface of the second lens 2 or at a backward position spaced apart from the second lens 2. A condenser lens 5 is placed at a position where said inverted image by the first lens 1 is formed in the air.

When an inverted image A is formed in the air by the first lens 1 between the first lens 1 and second lens 2, one portion of the image A which is included in the light beam into a microlens element 2a from the aperture 3 is focused as a small split erect image Aaa upon the sensitized material 4. In a similar manner, the light beam passing through the microlens element 2n from the aperture 3 focuses a portion of the image A as a split image Ana upon the sensitized material 4.

When the aperture 3 is displaced to a position indicated by 3a and the first lens 1 is directed to another subject to be photographed, an image B is formed. The light beam from the aperture 3a passes through the microlens element 2a and focuses a split erect image Baa of a portion Ba of the image B. In the similar manner, the light beam from 3a passes through the microlens element 2n and focuses a split image Bna of a portion Bn of the image B. When the aperture is displaced to a position between the positions 3 and 3a, the split images of the image formed by the first lens 1 are focused upon the areas between the exposed areas of the sensitized material 4 when the aperture are in the positions 3 and 3a. It is noted that the positions of the aperture when displaced must not be overlapped upon the preceding positions.

Over the whole area of the sensitized material 4 are distributed the finely split images of the images formed by the first lens 1, and these split images are not overlapped one upon another.

In the compound photography described hereinabove, the number of scenes or subjects to be photographed is dependent upon the ratio of the exposure area when the light shielding plate having the above described aperture is removed, to the exposure area when the aperture is set. That is, the number of subjects to be photographed may be determined by the ratio of the effective area of the first lens at the position of the aperture to the area of the opening of the aperture.

For example, when the effective diameter of the first lens 1 at the position of the aperture is 30 mm; its focal distance, 95 mm; the distance between the aperture and the image formed in the air by the first lens, 80 mm, the distance between the aperture and the second lens 2.40 mm; the opening of the aperture, $(1.2 \text{ mm})^2$; and the pitch of the displacement in vertical and horizontal directions of the aperture, 3 mm, $5^2 (=25)$ subjects may be photographed when the aperture is displaced in the vertical and horizontal directions by five steps respectively. A shutter may be disposed immediately before or after the aperture or at any other suitable position. It is noted that when the sensitized material 4 is made integral with the second lens 2, the latter must be removed out of the photographic device and developed in a suitable manner.

From the foregoing, it is understood that the images of the compound photography are distributed over the whole area of the sensitized material as finely split images so that is is impossible to directly read what kinds of images are actually recorded. The developed split images may be reproduced by illuminating the light from the back of the sensitized material developed in the optical system similar to that described hereinabove.

THE INVENTION

The present invention provides a device for projecting such finely split images upon a screen so as to reproduce the original image of a subject.

Figure 2:
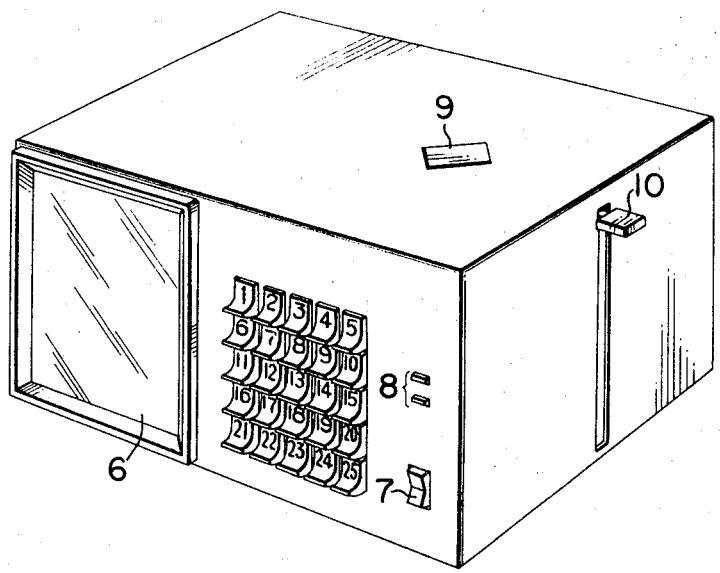
FIG. 2 is a perspective view of a projection device according to a embodiment of the present invention.

FIG. 2 is a perspective view of the device in accordance with the present invention, which comprises a projection screen 6 consisting of a frosted glass or the like, a group of pushbuttons arranged in the front wall of the device for selecting a desired image to be projected, each pushbutton being marked with a numeral so as to facilitate the image selection, a main switch 7 and a pilot lamp 8. At the top of the projection device is provided a hinged cover 9 for opening and closing an opening into which is placed a developed sensitized material having finely split images described above (to be referred to as "original" hereinafter for brevity), and at one side wall of the device is provided a knob 10 for extending an original holder beyond the original opening.

The original used in the present invention is the above described second lens 2 in the form of a transparent plate having a plurality of microlenses attached to the front surface thereof and finely split images of 25 subject images. Therefore, a total of 25 pushbuttons are provided at the front wall of the device for selecting these subjects or images. The subjects or images recorded upon the original may be suitably selected by referring back to the record such as index-cards, original storage cases, etc. upon which are recorded the numbers of the contents of the original.

Figure 3:
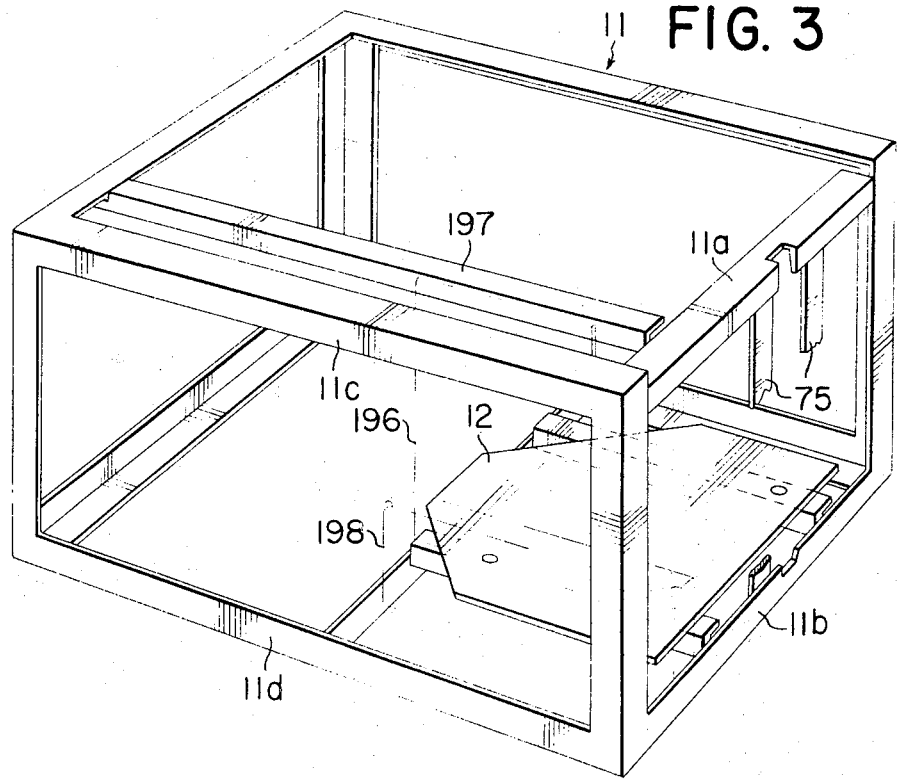
FIG. 3 is a perspective view illustrating only the housing frame members of the embodiment.

All of the mechanisms and components of the system of the present invention are enclosed in a rigid frame 11 shown in FIG. 3 and upon a base or supporting plate 12 fixed to the lower right portion of the frame 11 are mounted the principal components such as a driving mechanism, a projection optical system, etc.

Figure 7:
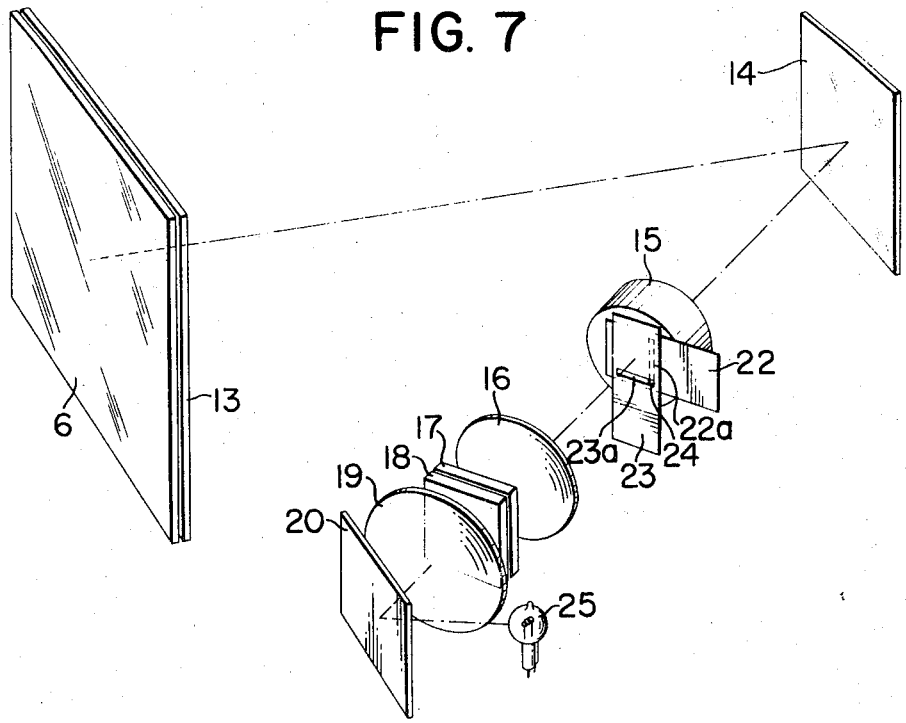
FIG. 7 is a perspective view illustrating the arrangement of optical components in the projection system of the embodiment.

The optical system employed in the present invention is diagrammatically illustrated in FIG. 7, and comprises the screen 6, a Fresnel lens 13 overlaid upon the inner surface of the screen 6, a fixed reflecting mirror 14, a projection lens 15, a condenser lens 16, an original 17 of the character described above, a microlens plate 18 having the same number of microlenses as that of the original 17, another condenser lens 19 and movable mirror 20.

Figure 4:
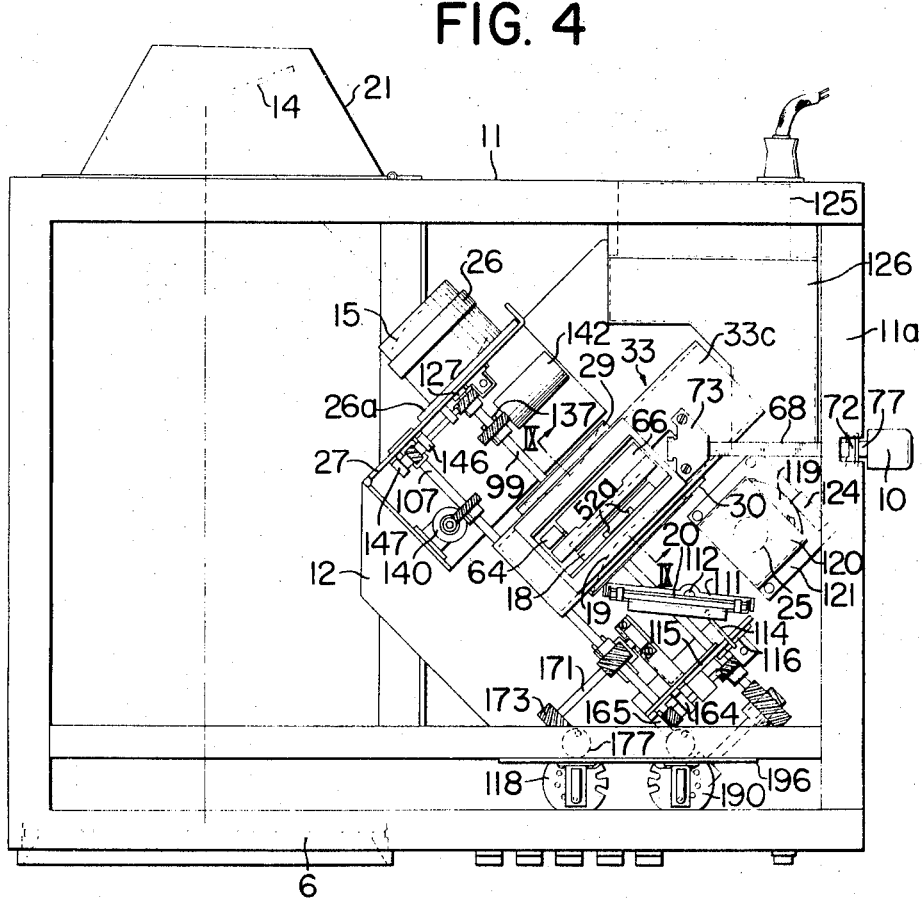
FIG. 4 is a plane view of the embodiment.

As shown in FIG. 4, the fixed mirror 14 is disposed in a projected housing 21 formed at the back of the device and is adapted to reflect the light through the projection lens 15 toward the projection screen 6.

It is noted that the projection lens 15 corresponds to the first lens 1 (See FIG. 1) described above. Behind the projection lens 15 are slidably arranged horizontally and vertically movable plates 22 and 23 having slots 22a and 23a respectively. (See FIG. 7). These elongated slots 22a and 23a are so formed and arranged that they intersect with each other at right angles, thereby forming an aperture 24, which corresponds to the movable aperture 3 described above (See FIG. 1) and is adapted to displace in the vertical and horizontal directions in response to the image selection operation by the pushbuttons. The condenser lens 16 corresponds to the condenser lens 5 described above with reference to FIG. 1.

The original 17 corresponding to the second lens 2 in FIG. 1 is detachably mounted in the projector of the present invention.

The microlens plate 18, the condenser lens 19 and the movable mirror 20 are disposed so as to effectively illuminate the original 17 by the light emitted from a light source 25 disposed laterally of the movable mirror 20.

Figure 5:
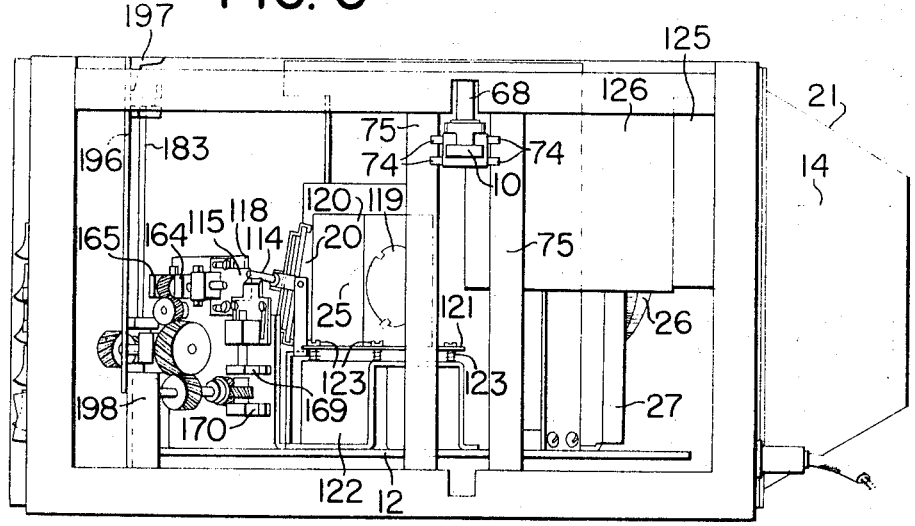
FIG. 5 is a side view of the embodiment.
Figure 6:
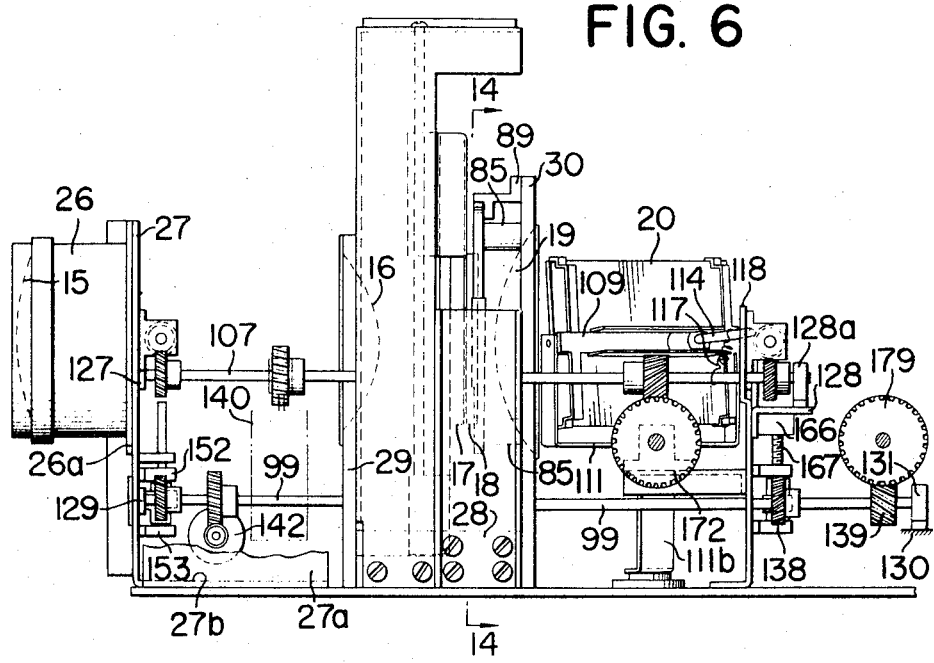
FIG. 6 is a side view illustrating one portion thereof removed from the housing of the embodiment.
Figure 9:
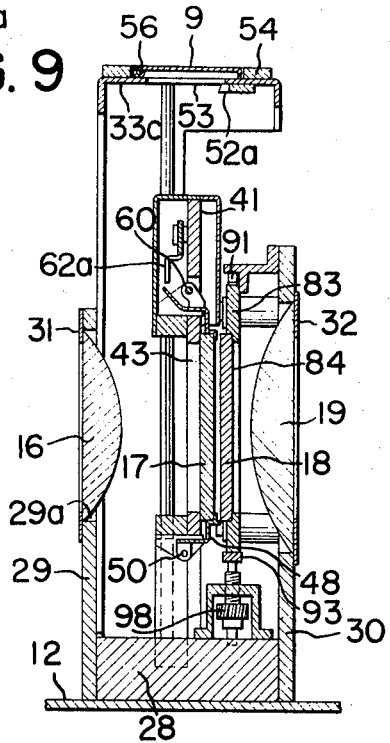
FIG. 9 is a sectional view on enlarged scale taken along the line 9—9 of FIG. 4.

Referring to FIGS. 4 to 6, the projection lens 15 is held in position in a lens barrel 26 which has its flange 26a securely fixed to a support 27 which is fixed to the base 12. At the center of this base 12 is fixed a stand 28 as shown in FIGS. 9 and 12, to which are fixed the lower end portions of the mounting members 29 and 30 having the condenser lenses 16 and 19 mounted thereupon respectively. In FIG. 9, the condenser lens 16 is mounted upon a thin plate 31 having a "square" aperture and being fixed over a circular opening 29a to the mounting member 29. In the similar manner, the condenser lens 19 is attached to the mounting member 30 through a thin plate 32.

Figure 13:
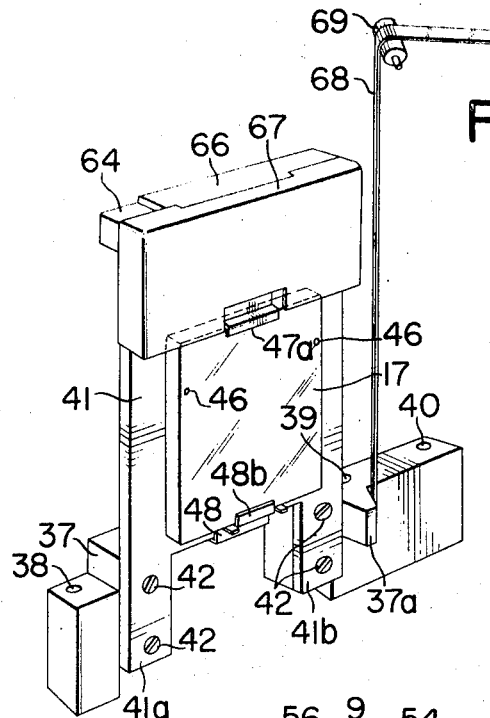
FIG. 13 is a perspective view of the original holder.
Figure 23:
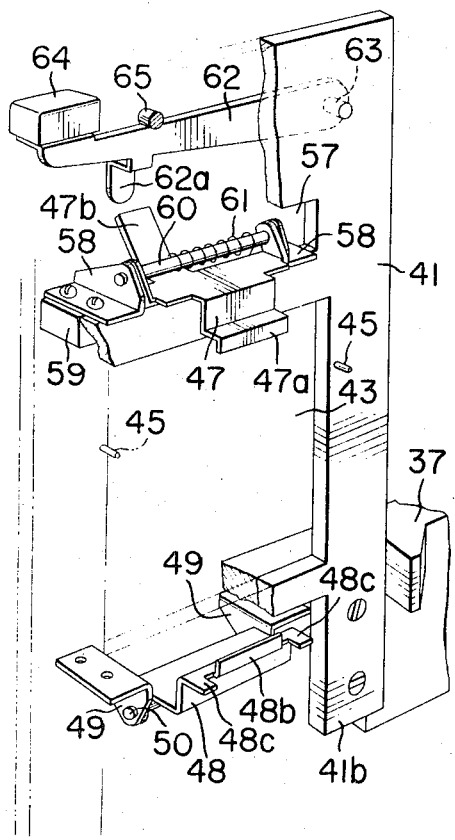
FIG. 23 is a perspective view of means for mounting the original.

The leg portions 33a and 33b of an inverted U-shaped holder supporting member 33 are fixed to the base 28 as best shown in FIG. 12. Three guide posts 34, 35 and 36 are arranged in parallel with each other with the upper and lower ends of these posts being fixed to the top plate 33c of the supporting member 33 and the base 28 respectively. These posts 34, 35 and 36 are fitted into the holes 38, 39 and 40 respectively of a vertically movable member 37 having a relatively much thickness as shown in FIG. 13. The leg portions 41a and 41b of an original holder 41 are fixed to the side surfaces of the member 37 by means of screws 42. The original holder 41 is adapted to detachably mount thereupon the original 17, and has a "square" aperture 43 over which is placed the original 17. (See FIG. 10). As shown in FIG. 23, the original 17 may be placed in its correct position by means of two pins 45 extended from both of sides of the aperture 43 and adapted to fit into the positioning holes 46 of the original (See FIG. 13). Thereafter, the original 17 may be firmly held upon the holder 41 by means of upper and lower elastic pressure members 47 and 48 which press the upper and lower side edges of the original 17 respectively against the original holder 41.

Figure 11:
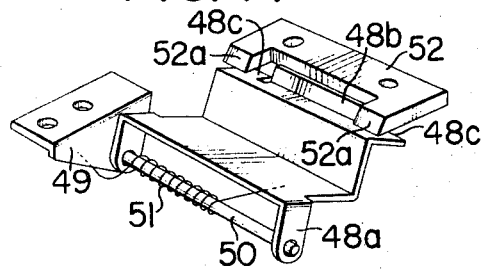
FIG. 11 is a perspective view illustrating a lower original pressure member pivotally mounted on the original holder and held in wide opened position by pawls.
Figure 10:
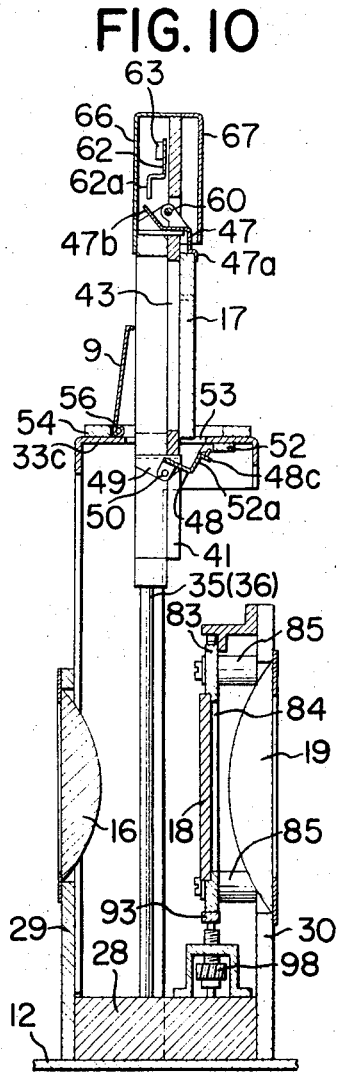
FIG. 10 is a view similar to FIG. 9 illustrating the original holder in its raised position.

The lower original pressure member 48 is rotatably mounted on the vertically moving member 37 by the ears 48a fitted over a shaft 50 extending between a pair of journal members 49 fixed to the vertically moving member 37. The lower pressure member 48 is normally biased so as to rotate in the counterclockwise direction in FIG. 9 by means of a spring 51 (See FIG. 11) loosely wound around the shaft 50, thereby pressing the lower side edge portion of the original 17 against the original holder 41. A pair of projections 48c are extended from both sides of the original pressing portion 48b of the lower pressure member 48 at right angles relative to the original and are adapted to engage with pawls 52a of engaging members 52 fixed to the back surface of the top plate 33c of the original holder supporting member 33 when the original holder 41 is lifted along the guide posts 34, 35 and 36 by the operation to be described hereinafter, as best shown in FIG. 10. Therefore, as best shown in FIGS. 10 and 11, the lower pressure member 48 is rotated against the spring 51 so as to release the original holding portion 48b from the original 17. The top plate 33c of the original holder supporting member 33 has a rectangular hold 53 through which thrusts the original holder 41 and from one side edge of which is inwardly extended the pawl 52a. To a frame 54 fixed to the top plate 33c of the original holder supporting member 33 is hinged the cover 9 which opens and closes the hole 53. The cover 9 normally closes the hole 53 by its own gravity, but when the original holder 14 is lifted as shown in FIG. 10, the upper end of the original holder 41 pushes the cover 9 which is exposed from the upper wall of the device as shown in FIG. 2.

Referring now to FIG. 23, the upper original pressure member 47 is disposed in an elongated slot 57 formed through the upper portion of the original holder 41 and carried rotatably on a shaft 60 journalled between a pair of upwardly projected elements 58. The shaft 60 has a spring 61 wound therearound so that the original pressure member 47 is normally biased to rotate in the clockwise direction in FIG. 10 to hold the original. The portion 47a of the original pressure member 47 normally presses the lower edge of the original 17 against the original holder 41. The upper original pressure member 47 has an arm 47b extended upwardly on the slant. Immediately above this arm 47b is arranged an arm 62a of an original setting arm 62 which is mounted pivotably to the original holder 41 by means of a pin 63 and is normally biased to rotate in the clockwise direction in FIG. 23 by means of a spring (not shown). At the free end of the arm 62 is attached a knob 64 and a stopper 65 extended from the original holder 41 is adapted to limit the rotation of the arm 62. The knob 64 is extended beyond decorating or ornament plates 66 and 67 (See FIG. 13) which covers the upper portion of the original holder 41 so that when the original holder 41 is lifted as shown in FIG. 10, the knob 64 may be depressed by a finger. Upon depression of the knob 64, the original setting arm 62 may be rotated so that the arm 62a thereof pushes down the aslant extended arm of the original pressure member 47, whereby the original pressure member 47 is rotated against the spring 61 wound around the shaft 60. Thus, the original holding portion 47a is released from the original 17. Therefore, when the knob 64 is depressed while the original holder 41 is lifted as shown in FIG. 10, and the lower original pressure member 48 is rotated, the original 17 is supported only by means of pins 45 (See FIG. 23) so that the original 17 may be detached from the original holder 41 and a new original may be set in position when required.

The operation for lifting the original holder 41 may be effected from the exterior of the apparatus. In FIG. 13, an end of a belt 68 is fixed to the sloped back surface of the extended portion 37a of the vertically moving member 37 and is directed in the horizontal direction by a small diameter guide roller 69 disposed above the projection 37a. As shown in FIG. 4, the belt 68 is extended at a right angle relative to the side frame 11a of the frame 11 and is directed downwardly by means of a guide roller 71 (See FIG. 51) disposed at the inner surface of the side frame 11a. The outer end of the belt 68 is fixed to a slider 72. The guide roller 69 is rotatably mounted to a plate member 73 which is fixed to the top plate 33c of the original holder supporting member 33. The plate member 73 carrying the roller 69 also supports a member to change the direction of the belt between the top plate 33c and the plate member 73 so as to prevent the belt 68 from moving in a zigzag manner.

Figure 51:
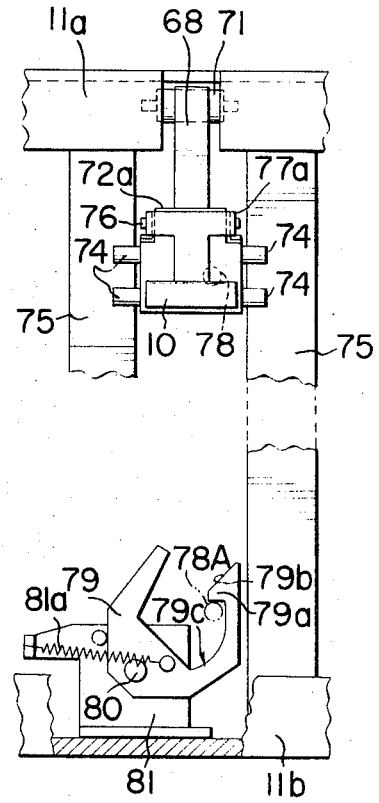
FIG. 51 is a front view of means for vertically moving the original holder.

Referring to FIGS. 51 and 52, four rollers 74 are rotatably mounted to the slider 72 at both sides thereof and the inner side edges of two parallel guide plates 75 fixed to the lower side frame 11b opposed to the side frame 11a are loosely held between the pair of opposed rollers 74 so that the slider 72 may be vertically movable along the guide plates 75. A projection 72a extended from the upper surface of the slider 72 has a knob-carrying arm 77a made integral with the knob 10 and pivotably mounted to the projection 72a at both ends thereof by means of pins 76. Upon vertical movement of the slider 72, that is the vertical movement of the original holder having the belt 68 fixed thereto, the knob 10 is set in horizontal position as shown in FIG. 54. On the other hand, when the knob 10 is not used, it is placed in vertical position as indicated by the chain line 10A in FIG. 54.

When it is desired to extend the original holder out of the projector, the knob 10 is displaced downwardly so that a pin 78 extended from the inner surface of the slider 72 may engage with a hook 79a of an engaging member 79. Thus, the original holder may be prevented from falling down by its own weight. The engaging member 79 is pivotably mounted to a stationary member 81 by means of a pin 80 and a compression spring 82 loaded between the member 81 and the engaging member 79 is adapted to rotate the engaging member 79 in the counterclockwise direction or clockwise direction depending upon whether the imaginary line connecting the ends of the spring 81a is located upwardly or downwardly of the pin 80. In FIG. 51, the engaging member 79 has a tendency of rotating in the counterclockwide direction while in FIG. 53, in the clockwise direction. When the pin 78 is displaced downwardly and pushes the sloped edge 79b of the hook 79a, the engaging member 79 is slightly rotated in the clockwise direction against the spring 81a so that the pin 78 is positioned for engagement with the hook 79a as indicated by the chain line 78A. In this state, the original may be set in position or detached. After detaching the original and placing a new original, the knob 10 is moved further downwardly so that the pin 78A pushes the inner side edge 79c of the engaging member 79 so that it is rotated to the position indicated in FIG. 53. In this case, as described above the engaging member 79 has a tendency of rotating in the clockwise direction so that it remains in this position even when the pin 78b is released from the inner side edge 79c in FIG. 53. Thereafter, the knob 10 is returned upwardly so that the pin 78b is spaced apart from the inner side edge 79c and pushes the inner side edge of the arm 79d of the engaging member 79, thereby rotating it to the initial position shown in FIG. 51. When the knob 10 is further lifted to its uppermost position, the original holder is set in a predetermined position in the projector.

A plate spring 82 fixed to the inner surface of the slider 72 has projections 82a bent outwardly and pressed against the ear 77a of the knob supporting arm 77 so as to hold the knob 10 in its horizontal and vertical positions. By interconnecting between the original holder and the operation knob disposed at the exterior of the projection device, the handling of the original is much facilitated and the orientation of the projection device of the present invention is further improved.

Referring to FIGS. 9, 10 and 14, the microlens plate 18 is placed in opposed relation with the original 17 and the periphery of the plate 18 is attached to that of a "square" aperture 84 formed in a "square" frame 83. As best shown in FIG. 14 and FIG. 16, the square frame 83 is fixed to four short columns 85 extended from the microlens mounting member 30 by means of screws 86. The diameter of each hole 87 drilled through the square frame 83 and adapted to receive therein the screw 85 is made larger than that of the screw 86 (See FIG. 16) so that the square frame 83 may be vertically and horizontally oriented within the diameter of the hole 87 relative to the condenser lens mounting plate 30. In FIG. 16, reference numeral 88 designates a washer whose diameter is larger than that of the hole 87 and which serves to prevent the square frame 83 from being released from the screws 86.

Normally curved springs 92 and 91 are loaded between the left side 83b of the square frame 83 and a spring receiving member 90 and the upper side 83a of the square frame 83 and a spring receiving member 89 respectively. These springs 91 and 92 have a tendency of bending so that the square frame 83 is elastically forced in the lower and right directions in FIG. 14, whereby the lower surface 83c and the right surface 83d of the square frame 83 may be pressed against stoppers 93 and 94 respectively. The spring receiving members 89 and 90 are fixed to the condenser lens mounting plate 30. The stop member 93 is attached to the leading ends of two screw-threaded rods 95 and 96 which are screwed into a screw receiving member 105a securely fixed to the base 28. The screw-threaded rods 95 and 96 are in mesh with gears 97 and 98 respectively so as to rotate in the opposed directions with respect to each other. The screw-threaded rod 95 has right-handed screw threads while the rod 96, left-handed screw threads so that when they are rotated in the opposed directions, they are advanced or retracted in the same axial direction. The gear 97 is driven through a worm 100 carried by a driving shaft 99 to be described in more detail hereinafter so that when the stop member 93 is raised, the square frame 83 is moved upwardly against the plate spring 91. The threaded-rod-gear mechanism similar to that described above is also arranged at the right side of the square frame 83. That is, the stopper 94 is attached to the leading ends of the screw-threaded rods 102 and 104 carrying the gears 101 and 103 respectively. The operation of the second threaded-rod-gear mechanism on the right side is same as that described above. The screw receiving member 105b is fixed to the upper inner surface of an elongated plate 106 which is rigidly fixed at its base portion to the end surface of the base 28. The gear 103 is driven by a worm 108 carried by a driving shaft 107.

The square frame 83 is adapted for displacement within a small range in response to the displacemeet of the movable aperture at the rear surface of the projection lens, so that the microlens plate 18 may be displaced to a desired position in response to the position of the aperture, thereby permitting the most efficient use of the illumination light as will be described in more detail hereinafter.

Figure 19:
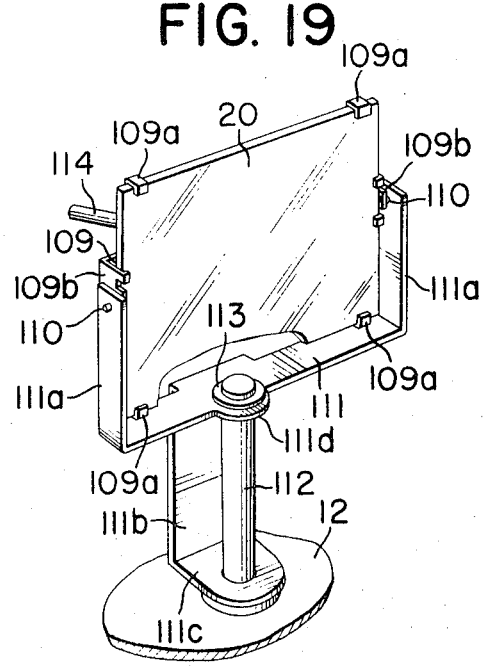
FIG. 19 is a perspective view of one embodiment of the movable mirror.

The movable mirror 20 is disposed backwardly of the condenser lens 19 for rotation about the horizontal and vertical axes so as to reflect the light from the light source 25 toward the condenser lens 19. As best shown in FIG. 19, the pawls 109a of a mirror mounting member 109 are adapted to engage with the upper and lower side edges of the movable mirror 20. The mirror mounting member 109 has its short pins 110 extending from the bent portions 109b formed at both ends of the mounting member 109 and the pins 110 are journalled by a pair of upright arms 111a of a mirror supporting yoke member 111 so that the mirror 20 may rotate about the pins 110. The leg portion 111b of the yoke member 111 has its lower end portion bent horizontally as shown by 111c and a vertical shaft 112 is fitted into the holes of the projection 111d and the bent portion 111c so that the yoke member 111 may rotate about the vertical shaft 112. Thus it is seen that the movable mirror 20 may be rotated in both of the vertical and horizontal directions. The vertical shaft 112 is fixed to the base plate 12 and has a washer 113 attached to the top end thereof so as to prevent the mirror mounting yoke member 111 from being detached from the vertical shaft 112.

Referring back to FIG. 8, a rod 114 is extended from the mirror mounting member 109 at an angle relative to the mirror 20 and is engagable with both of knife-edges 115a and 116a of transversely sliding plate 115 and the longitudinally sliding plate 116 by means of a compression spring 117 (See FIG. 6) which is loaded between the rod 117 and the driving shaft 107. Both of the sliding plates 115 and 116 are slidably mounted to a longitudinal plate 118 by loosely fitting the rivets fixed to the longitudinal plate 118 into the elongated slots 115b and 116b (See FIGS. 5 and 6).

Referring to FIGS. 4 and 5, the lamp 25 is enclosed in a lamp house 120 having a concave reflecting mirror 119 and the bottom plate 121 of this lamp house 120 is mounted upon an inverted U-shaped stand 122 which is securely fixed to the base plate 12. The height as well as the inclination of the base plate 121 may be adjusted by rotating a bottom plate adjusting screws 123. The lamp 25 is received by a socket (not shown) fixed to the bottom plate 121 so that the adjustment of the bottom plate 121 means the adjustment of the position of the filament of the lamp 25. At the back of the lamp house 120 is fixed a thermostat 124 for detection of the temperature within the lamp house 120 so that when the temperature in the light source section exceeds a predetermined temperature, the current to the lamp 25 may be automatically interrupted.

Air is blown into the lamp house 120 through a duct 126 from a blower 125 attached to the upper portion of the back wall of the projector so that the lamp 25 may be cooled to prevent overheating of the lamp.

Figure 8:
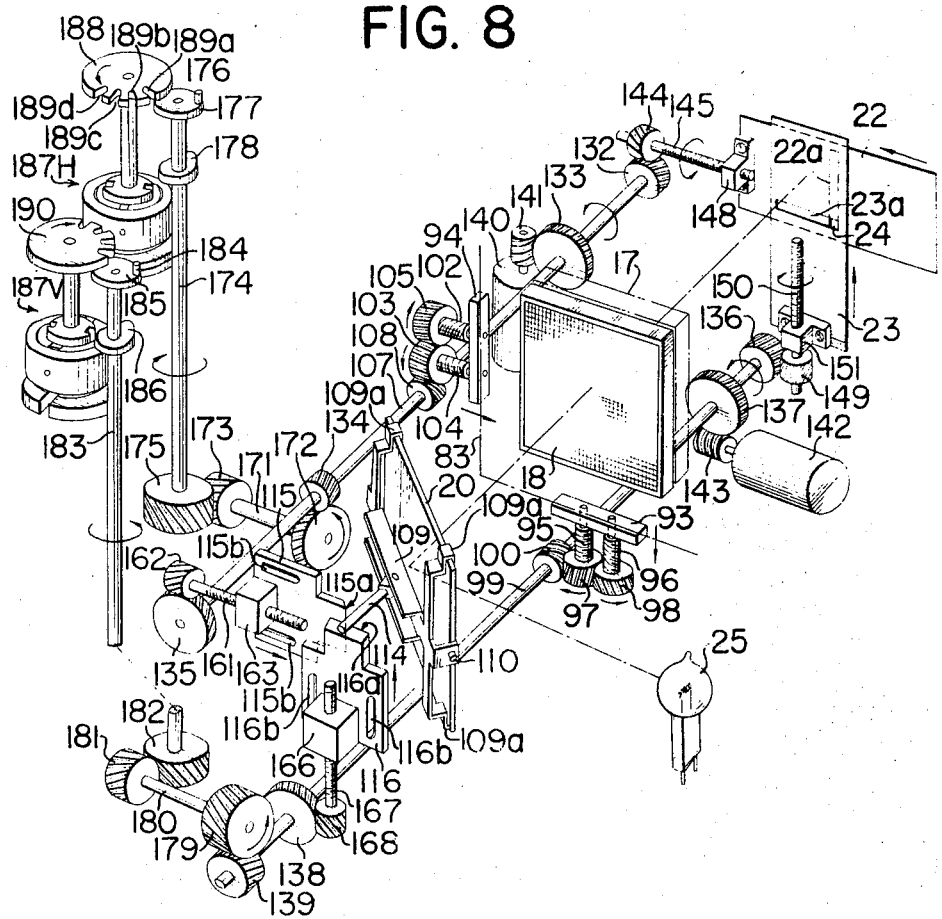
FIG. 8 is a perspective view illustrating the principal components in the drive system of the embodiment.

In FIGS. 4, 6 and 8, driving shafts 107 and 99 are arranged in parallel with each other and the optical axis of the projection lens. One end of the driving shaft 107 is journalled by a bearing 127 fixed to the supporting plate 27 while the other end thereof, by a bearing 128a fixed to an arm plate 128 which in turn is fixed to the longitudinal plate 118. The driving shaft 99 is journalled by a bearing 129 on the base plate 27 and a bearing 131 fixed to a suitable stationary member such as 130.

A helical gear 132, a worm wheel 133, the worm 108, a helical gear 134 and a helical gear 135 are carried by the driving shaft 107 while a helical gear 136, a worm wheel 137, the worm 100 and helical gears 138 and 139 are carried by the drive shaft 99.

The worm wheel 133 carried by the drive shaft 107 is in mesh with a worm 141 carried by the shaft of a DC motor 140 while the worm wheel 137 carried by the drive shaft 99, in mesh with a worm 143 carried by the shaft of a DC motor 142 of the same type as the motor 140. Both of the motors 140 and 142 are started, stopped and reversed by a switch control device to be described in more detail hereinafter, and are mounted on the side wall 27a and the bottom plate 27b integral with the supporting plate 27 (See FIG. 6). AC motors may be employed instead of the DC motors if they can be freely reversed in rotation by a selection switch.

The helical gear 144 is in mesh with the helical gear 132 carried by the drive shaft 107 and is fixed to the base end of the threaded rod 145, which is journalled by a pair of bearings 146 and 147 (See FIG. 4) fixed to the supporting plate 27. A screw receiving member 148 is fixed to the transversely movable plate 22 and in mesh with the threaded rod 145 so that upon rotation of the threaded rod 145, the movable plate 22 is caused to move transversely. The rod 145 is so threaded that when it rotates in the direction indicated by the arrow, the movable plate 22 may be caused to move in the direction indicated by the arrow.

The helical gear 146 in mesh with the helical gear 136 carried by the drive shaft 99 rotates the rod 150 fixed to the gear 146 so that a screw receiving member 151 in mesh with the rod 150 is caused to move vertically, thereby causing the vertical movement of the longitudinally movable plate 23. The threaded rod 150 is journalled by a pair of bearings 152 and 153 upon the supporting plate 27.

Figure 21:
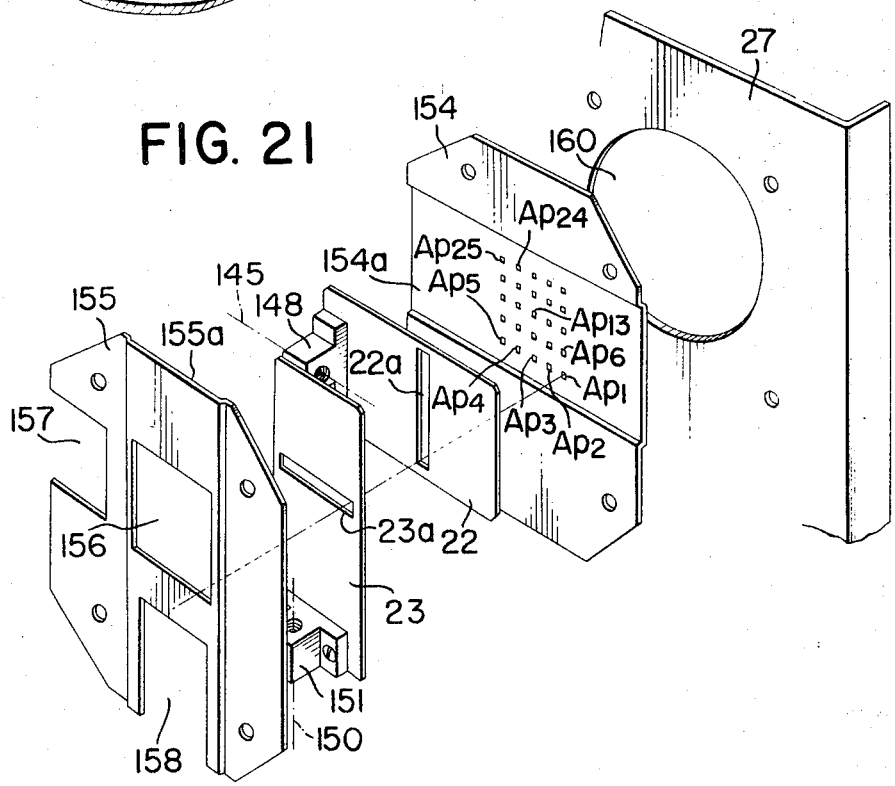
FIG. 21 is an exploded view of means for mounting movable plates for aperture position selection.

Both of the transversely and longitudinally movable plates 22 and 23 are loosely interposed between an aperture plate 154 and a pressure plate 155 shown in FIG. 21 and are adapted to slide along slots 154a formed in the aperture plate 154 and in a slot 155a formed in the pressure plate respectively.

Figure 22:
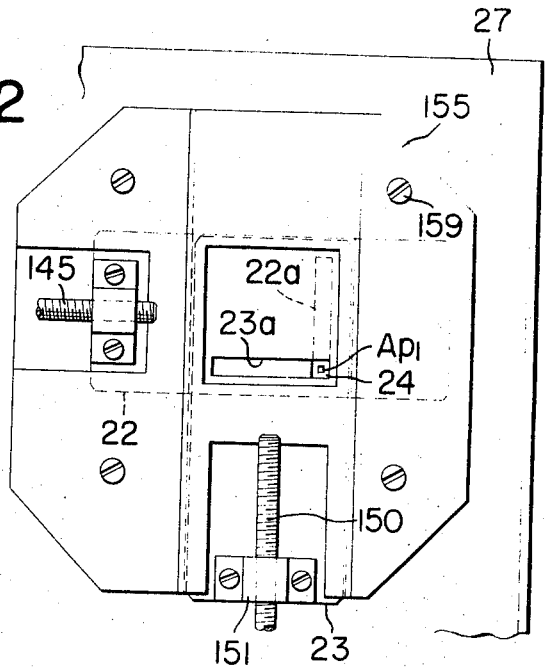
FIG. 22 is a rear view of the means in FIG. 21.

The aperture plate 154 is provided with a plurality of relatively small apertures Ap-1, Ap-2 – Ap-25 equidistantly spaced apart. The number of these apertures is same as that of the number of subjects or images recorded upon the original and in this instant embodiment is 25. One of the apertures is selected by the intersection of the elongated slots 22a and 23a of the movable plates 22 and 23 for transmission of the light therethrough. In FIG. 22, the elongated slot 22a is shown as being located at its rightmost position while the slot 23a, in its lowermost position so that their intersection coincides with the aperture Ap-1. The pressure plate 155 is provided with a "square" aperture 156 on one side of which is longer than the stroke of each of the elongated slots 22a and 23a, a notch 157 for permitting the free movement of the screw receiving member 145 of the transversely movable plate 22 and a notch 158 for permitting the free movement of the screw receiving member 151 of the longitudinally movable plate 123. The pressure plate 155 is fixed together with the aperture plate 154 to the supporting plate 27 by means of screws 159 (See FIG. 22). The supporting plate 27 is provided with a circular aperture 160 whose center coincides with the optical axis of the projection lens.

Referring back to FIG. 8, the helical gear 135 carried by the drive shaft 107 is in mesh with the helical gear 162 carried by the screw-threaded rod 161 which is screwed with a screw receiving member 163 fixed to the transversely slidable plate 115, so that upon rotation of the screw-threaded rod 161, the slidable plate 115 is caused to slide in the direction indicated by the arrow, thereby pushing the rod 114 extended from the movable mirror 20 by the knife-edge 115a of the plate 115. Therefore, the movable mirror 20 is caused to rotate about the longitudinal shaft 112 (See FIG. 19). The screw-threaded rod 161 is journalled by a pair of bearings 164 and 165 upon the longitudinal plate 118 (See FIGS. 4 and 5).

The helical gear 138 carried by the drive shaft 99 is in mesh with the helical gear 168 carried by a screw-threaded rod 167 which is screwed with a screw receiving member 166 of the longitudinal slidable plate 116, so that upon rotation of the screw threaded rod 167, the longitudinal slidable plate 116 is caused to slide upwardly, thereby pushing the rod 114 of the movable mirror 20 by the knife-edge 116a of the plate 116. Thus, the movable mirror 20 is caused to rotate about the horizontal shaft 110. The screw threaded rod 167 is journalled by a pair of bearings 169 and 170 upon the longitudinal plate 118 (See FIG. 5).

The helical gear 134 carried by the drive shaft 107 is in mesh with a helical gear 172 carried at one end of a horizontal shaft 171 having relatively short length. A helical gear carried at the other end of the shaft 171 is in mesh with a helical gear 175 carried at the lower end of a longitudinal shaft 174 extending vertically and having an eccentric pin 176 fixed to the upper surface of a disk 177 fixed to the upper end of said shaft 174 and a cam 178 spaced apart downwardly from the disk 177.

The helical gear 139 carried by the drive shaft 99 is in mesh with the helical gear 179 carried at one end of a shaft 180 which has a helical gear 181 fixed to the other end thereof and in mesh with a helical gear 182, so that the rotation of the drive shaft 99 may be transmitted to a longitudinal shaft 183 in parallel with the vertical shaft 174. The shaft 183 has a disk 185 having an eccentric pin 184 and a cam 186 vertically downwardly spaced apart from said disk 155.

A switch actuating assembly 187H is intermittently rotated upon one rotation of the eccetric pin 176. When the vertical shaft 174 makes one rotation in the direction indicated by the arrow, the eccentric pin 176 engages with a notch 189a of a disk 188 so that the disk 188 is caused to rotate in the direction indicated by the arrow. After a predetermined angle of rotation of the disk 188, the eccentric pin 176 is released from the notch 189a. The angle of rotation of the disk 188 by one rotation of the eccentric pin 176 is same as the angular distance between the two adjacent ones of the equiangularly spaced apart notches 189a, 189b and so on of the disk 188.

In the similar manner as described above, the eccentric pin 184 cause the intermittent rotation of a toothed disk 190 of another switch actuating assembly 187V. FIG. 39 is a plan view illustrating the eccentric pin 184 that is rotating the disk 190.

The switch actuating assembly 187H will be described in more detail with reference to FIGS. 30 to 36 hereinafter. A shaft 191 having the toothed disk 188 fixed at the upper end thereof has a large-diameter portion 191a at the lower portion thereof. The large diameter portion 191a has a flange 191b formed integral therewith at the lower end of the shaft 191, and two axial slots 192a and 192b in diametrically opposed relation with each other for receiving therein compression springs 193a and 193b respectively. A pair of keys 194a and 194b are fixed to the large diameter portion 191a in angularly spaced apart relation from said slots 192a and 192b by 90° respectively. The shaft 191 is journalled by a bearing 195 which has a pair of mounting portions 195a extended from both sides of the bearing 195 and fixed to a middle plate 196, which is located in inwardly spaced apart relation with the front panel of the projector by a small distance (See FIG. 3 and 4). To support this plate 196 and other components, the frame 11 is provided with a transverse beam 197 and a support 198 (See FIG. 3). The actuating assembly 187H is attached to the front surface of the plate 196 and the vertical shaft 174 is journalled by suitable bearings at the back surface of the plate 196. The eccentric pin 176 (See FIG. 8) driven by the vertical shaft 174 is operatively engaged with the toothed disk 188 through a horizontally elongated opening 196a formed through the plate 196. That is, a part of the periphery of the disk 188 extends beyond the opening 196a inwardly (See FIGS. 36 and 38).

Semi-cylindrical switch actuating members 199a and 199b are fitted over the large diameter portion 191a and spaced apart from each other by the keys 194a and 194b and over these switch actuating members 199a and 199b is fitted a cylindrical member 200, which is fixed to the large diameter portion 191a by means of screws 201 screwed in the radial direction through the keys 194a and 194b respectively. Therefore, each of the switch actuating members 199a and 199b may vertically move independently of each other. At the lower ends of the members 199a and 199b are formed flanges 202a and 202b respectively and pins 203a and 203b are extended from the inner surfaces of the switch actuating members 199a and 199b respectively. The spring 193a is interposed between the pin 203a and the flange 191b while the spring 193b between the pin 203b and the flange 191 b so that the switch actuating members 199a and 199b are normally biased downwardly with respect to the large diameter portion 191a. Since the lower ends of the switch actuating members 199a and 199b are received by the flange 191b, they are prevented from falling down from the large diameter portion 191a.

As described hereinabove, the toothed disk 188 is intermittently rotated by the eccentric pin. Upon rotation of the disk 188, the switch actuating members 199a and 199b attached to the large diameter portion 191a are rotated in unison with the disk 188. The disk 188 is adapted to stop temporarily by clickstop means 204 whenever the disk 188 rotates through a predetermined angle. Said click stop means is comprised of a ball-receiving arm 205 whose base is fixed to the plate 196, a ball received in a hole 205a drilled through the free end portion of the arm 205 and a plate spring 207 adapted to press elastically the ball 206 against the disk 188. Therefore, it is seen that whenever the disk 188 makes a rotation through a predetermined angle, the ball 206 engages with one of the recesses 188a formed in the upper surface of the disk 188. The plate spring 207 is fixed to the ball-receiving arm 205.

The other switch actuating assembly 187V has the same construction as that of assembly 187H described in detail hereinabove, so that no description of the assembly 187V will be made.

Figure 30:
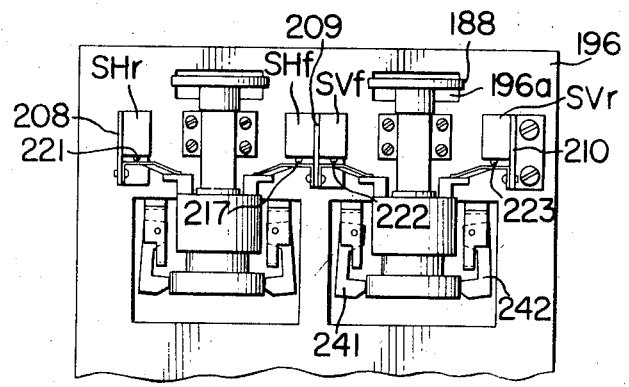
FIG. 30 is a front view of the system of FIG. 29.
Figures 31, 32:
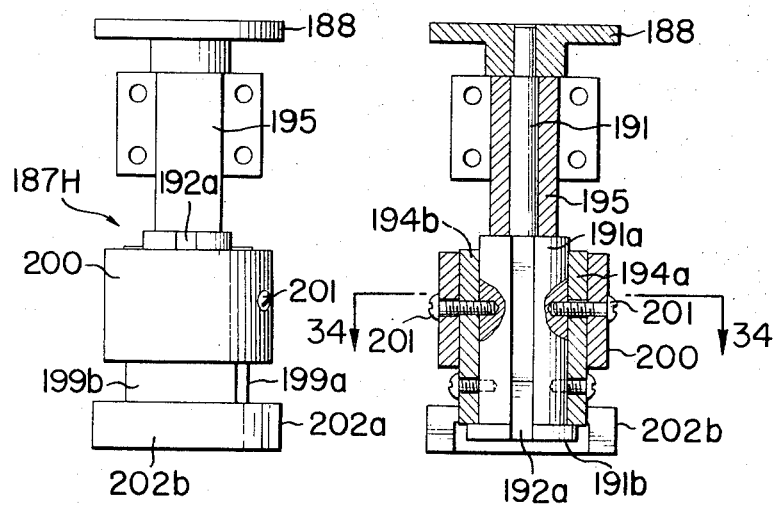
FIG. 31 is a front view illustrating only a switch actuating assembly which is one component of said switch control system.
FIG. 32 is a longitudinal sectional view of the assembly of FIG. 31.
Figure 33:
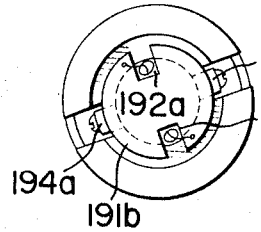
FIG. 33 is a bottom view of the assembly of FIG. 31.
Figure 34:
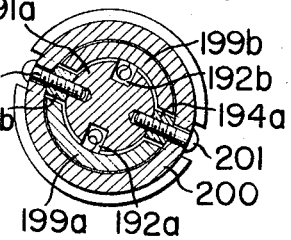
FIG. 34 is a sectional view taken along the line 34—34 of FIG. 32.

Referring particularly to FIG. 30, at the front surface of the plate 196 are arranged four microswitches SHr, Shf, SVr in side-by-side relation. The switch SHr is fixed to a plate 208 extending at a right angle relative to the plate 196; the switch SHf, to one side surface of the plate 209 while the switch SVf, the other side surface of the plate 209; and the switch SVr, to a plate 210. The plates 209, 210 and 208 are fixed to the plate 196.

Figure 50:
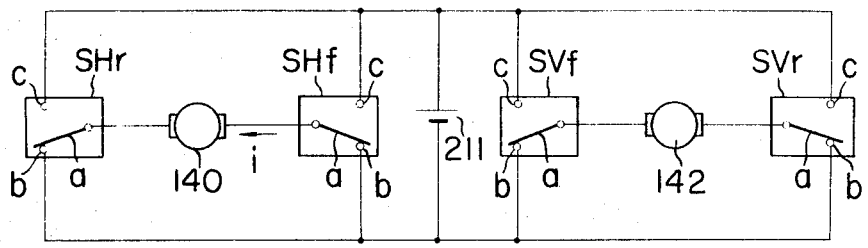
FIG. 50 is a circuit diagram of the drive system of the present invention.

The switches SHr and SHf are in the circuit of one DC motor 140 while the switches SVf and SVr, in the circuit of the other DC motor 142 as best shown in FIG. 50. That is, the moving contact of the switch SHr is connected to a terminal of the motor 140 while the moving contact of the switch SHf is connected to the other terminal of the motor 140, and both of the moving contacts $a$ are normally connected to the stationary contacts $b$ which is connected to the negative pole of the DC power source 211, so that the terminals of the motor 140 are normally connected with each other. When the moving contact $a$ of the switch SHf is connected to the stationary contact $c$ connected to the positive terminal of the power source 211, the current $i$ flows in the direction indicated by the arrow, so that the motor 140 is rotated in the forward direction. On the other hand, when the moving contact $a$ of the switch SHf is connected to the contact $b$ while the moving contact $a$ of the switch SHr is connected to the fixed contact $c$, the motor 140 is reversed in direction. The same is true for the motor 142. That is, when the moving contact $a$ of the switch SVf is connected to the fixed contact $c$, the motor 142 is rotated in the forward direction while when the moving contact $a$ of the switch SVr is connected to the fixed contact $c$, the motor 142 is reversed in direction.

Figure 29:
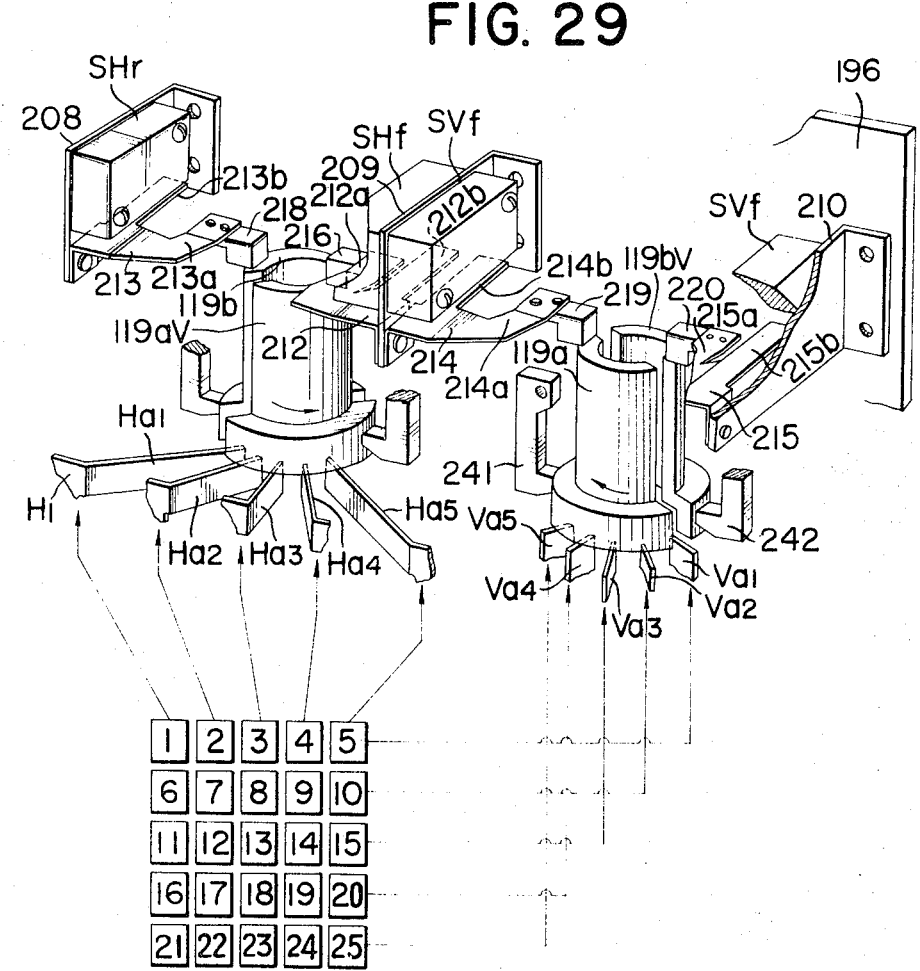
FIG. 29 is a perspective view for explanation of a switch control system in said assembly.

Referring to FIG. 29, the switching operation of the moving contacts of the switches SHf and SHr are made by the switch actuating members 119a and 199b through bifurcated resilient plates 212 and 213 respectively. In the similar manner, the switching of the switches SVf and SVr are made by the switch actuating members 119aV and 119bV through bifurcated resilient members 214 and 215.

A contact 216 is fixed to the leading end of one arm 212a of the bifurcated plate 212 fixed to the plate 209 and is in light contact with the upper end surface of the switch actuating member 119a. The leading end portion of the other arm 212b immediately below the switch SHf is in opposed relation with an actuator 217 (See FIG. 30). A contact 218 fixed to one arm 213a of the bifurcated plate 213 fixed to the plate 208 is in contact with the upper end surface of the switch actuating member 119aV while the contact 220 of the arm 215a of the bifurcated plate 215 is in contact with the upper end surface of the switch actuating member 119bV. The leading end of the other arm 213b of the bifurcated plate 213 is in opposed relation with an actuator 221 (See FIG. 30) of the switch SHr; the leading end of the arm 214b of the bifurcated plate 214 is in opposed relation with the actuator 222 (See FIG. 30) of the switch SVf; and the leading end of the arm 215b of the bifurcated plate 215 is in opposed relation with an actuator 223 (FIG. 30) of the switch SVr. The switch actuating members 119a, 119b, 119aV and 119bV are moved upwardly by depression of the image selection pushbuttons so that the switch corresponding to the depressed pushbutton and consequently the switch actuating member corelated with this pushbutton is actuated so as to rotate the motor. The image selection pushbuttons are arranged upon the front panel of the projector in such a manner that more than two pushbuttons will not be depressed simultaneously. Upon depression of one pushbutton, one of the switch actuating members 119a 119b, 119aV and 119bV is pushed up or either of the switch actuating members 119a or 119b and either of the switch actuating members 119aV or 119bV are pushed up simultaneously. However, when one image has been already selected, the pushbutton corresponding to this selected image will be depressed, but the switch actuating members will not be actuated or operated at all.

Figure 24:
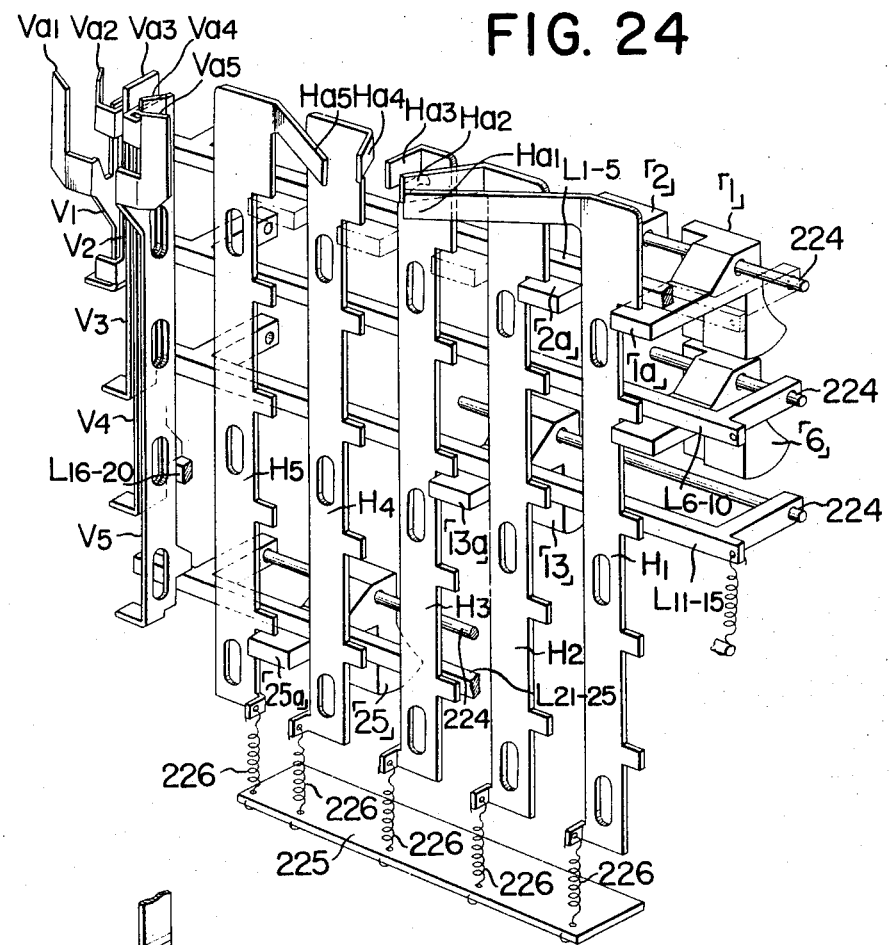
FIG. 24 is a perspective view of an image selection assembly seen from the interior thereof.
Figure 25:
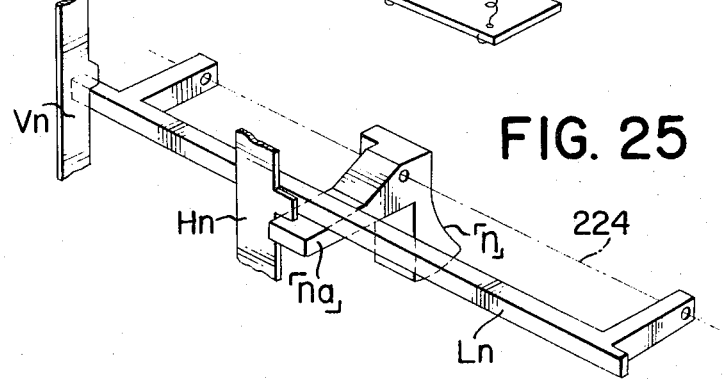
FIG. 25 is a perspective view of a component shown in FIG. 24.
Figure 28:
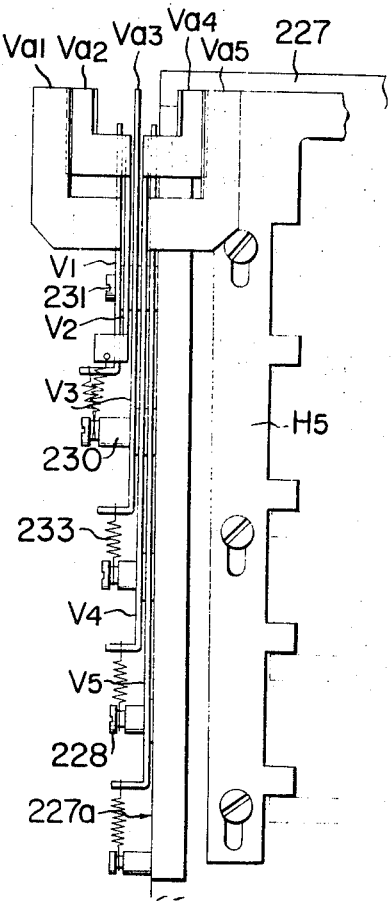
FIG. 28 is a rear view of the members of FIG. 26.

The image selection pushbuttons are pivotably mounted to a mounting frame 227 arranged in the right side between the upper and lower front frames 11c and 11c of the frame 11(See FIG. 3). A part of the mounting frame 227 is shown in FIG. 28. In FIGS. 24 and 25, in order to array the image selection pushbuttons, five transverse shafts 224 are extended in parallel with each other between the opposed two sides of the mounting frame 227, and five pushbuttons are pivotably mounted to each of the shafts 224. As shown in FIGS. 2 and 29, the pushbuttons are sequentially numbered from the one at the leftmost in the uppermost row.

Arms $1a, 2a, -(na)25a$ are extended from the inner upper portion of the pushbuttons $1, 2, -n, -25$ respectively and connecting rods $L_{1-5}, L_{6-10}, -L_{21-25}$ loosely pivoted to the transverse shafts 224 are riding upon the arms $1a, 2a, -25a$.

Vertically slidable elongated plates H-1, H-2, H-3, H-4 and H-5 are slidably mounted to the inner surface of the mounting frame 227 and are normally biased downwardly by means of compression springs 226 interposed between the lower ends of these sliding plates $H_1$ to $H_5$ and a plate 225 fixed to the lower end surface of the mounting plate 227. The sliding plates $H_1$ to $H_5$ have along their one side edges five projections adapted to engage with the upper end surfaces of the arms of the pushbuttons in columns and arms $H_{a1}, H_{a2}, H_{a3}, H_{a4}$ and $H_{a5}$ which are curved so as to be directed toward a common point as best shown in FIG. 24. As shown in FIG. 29, these arms $H_{a1}$ to $H_{a5}$ have their free ends located below the switch actuating member 119a so that when one pushbutton operatively connected to one of the sliding plates $H_1$ to $H_5$ is depressed, the switch actuating member 119a is lifted. When the switch actuating assembly is rotated from its position shown in FIG. 2 through 180°, the free ends of the arms $H_{a1}$ to $H_{a5}$ are located immediately below the switch actuating member 119b and when the assembly is rotated through 90°, the arms $H_{a1}$ to $H_{a5}$ are located below both of the actuating members 119a and 119b.

Figure 26:
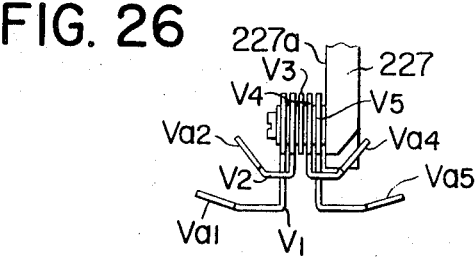
FIG. 26 is a plan view of a group of vertical aperture position control switch actuating members incorporated in said image selection assembly.
Figure 27:
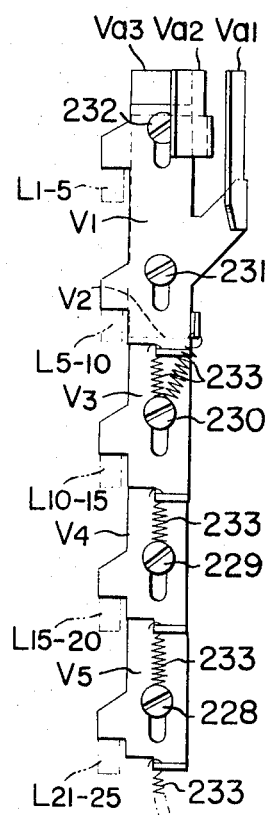
FIG. 27 is a side view of the members of FIG. 26.

Vertically sliding plates $V_1$ to $V_5$ in overlapped relation are vertically slidably mounted to the side surface 227a of the mounting frame 227 (See FIGS. 26, 27 and 28) by means of pivots 228 to 232 and are normally biased downwardly by means of compression springs 233 interposed between the lower ends of the sliding plates $V_1$ to $V_5$ and the pivots 228 to 232. Each of the vertically sliding plates $V_1$ to $V_5$ has at its side edge a projection which engages with the connecting rod from the upper side thereof. That is, in FIG. 27, the projection of the sliding plate $V_1$ engages with the connecting rod $L_{1-5}$; the projection of the sliding plate $V_2$, with the connecting rod $L_{5-10}$; the projection of the sliding plate $V_3$ with the connecting rod $L_{11-15}$; the projection of the sliding plate $V_4$, with the connecting rod $L_{16-20}$; and the projection of the sliding plate $V_5$, with the connecting rod $L_{21-25}$ respectively. The upper ends $V_{a1}, V_{a2}, V_{a3}, V_{a4}$ and $V_{a5}$ of these vertically sliding plates $V_1$ to $V_5$ are arranged along one arc immediately below the switch actuating member 119aV as best shown in FIG. 29.

The image selection assembly is thus comprised of a group of image selection pushbuttons, sliding plates $H_1$ to $H_5$ and $V_1$ to $V_5$ and connecting rods $L_{1-6}$ to $L_{20-25}$ for connecting the pushbuttons and the sliding plates $V_1$ to $V_5$. The mode of operation of the image selection assembly will be described hereinafter. Upon depression of the pushbutton 1, the sliding plate $H_1$ is moved upwardly by the arm 1a of the pushbutton 1 and the connecting rod $L_{1-5}$ is rotated simultaneously about the pivot 224 so that the vertically sliding plate $V_1$ is caused to move upwardly. In the similar manner upon depression of the pushbutton 2, the sliding plates $H_2$ and $V_2$ are caused to move upwardly. When the pushbutton 6 arranged in the second row is depressed, the sliding plates $H_1$ and $V_2$ are caused to move upwardly. Upon depression of the pushbutton 13 at the center of the arrayed pushbuttons, the sliding plates $H_3$ and $V_3$ are simultaneously caused to move upwardly. Thus, it is seen that upon depression of one pushbutton, one of the sliding plates from $H_{1-5}$ H-5 and one of the sliding plates from $V_1$ to $V_5$ are simultaneously caused to move upwardly. In other words, when one pushbutton n is depressed, the sliding plate Hn which is directly operatively connected to this pushbutton n and the sliding plate Vn which is correlated with the sliding plate Hn through the connecting rod Ln are simultaneously caused to move upwardly. More particularly, when one of the pushbuttons arrayed in one row is depressed, only one selected sliding plate is caused to move upwardly. On the other hand, when one of the pushbuttons arrayed on one column is depressed one of the sliding plate which is operatively connected to said depressed pushbotton through the connecting rod will be caused to move upwardly. In FIG. 29, the arm $H_{a1}$ of the sliding plate $H_1$ is interposed between the switch actuating member 119a and 119b while the upper end $V_{a1}$ of the sliding plate $V_1$ is interposed between the switch actuating members 119aV and 119bV. In this state, even when the pushbutton 1 is depressed so as to move upwardly the arm $H_{a1}$ and the upper end $V_1$, the switch actuating members are not actuated. This means that the first image upon the original is already selected, that is the aperture $A_{p1}$ shown in FIGS. 21 and 22 is already selected. Upon depression of the pushbutton 2, the arm $H_{a2}$ as well as the upper end $A_{a1}$ are simultaneously moved upwardly, but in this case, only the arm $H_{a2}$ is effective so as to move upwardly the switch actuating member 119a so that the forward rotation switch SHf is actuated through the bifurcated plate 212, whereby the motor 140 is rotated. Therefore, the drive shaft 107 is rotated in the direction indicated by the arrow in FIG. 8 so that the transversely movable plate 22 operatively connected to the shaft 107 is displaced in the direction indicated by the arrow. When the elongated slot 22a of the plate 22 is displaced to a position corresponding to the aperture Apa (See FIG. 21), the vertical shaft 174 operatively connected to the drive shaft 107 is caused to make one rotation so that the eccentric pin 176 engages with the notch 189a of the disk 188 so as to cause the disk 188 to rotate in the direction indicated by the arrow by one step. Upon rotation of the disk 188, the switch actuating member 119a is caused to rotate in the direction indicated by the arrow while being held in the raised position in FIG. 29. Upon rotation of the switch actuating member 119a, the arm $H_{a2}$ which holds the member 119a in its raised position is released from the lower end surface thereof so that the member 119a is returned to its lower initial position. Therefore, the switch SHf which has been in operative position is opened so that the the motor 140 is stopped. The interlocked operations of the sliding plates, switch actuating members and switches will be described hereinafter with reference to FIGS. 48 and 49. The switch actuating members are rotated as described hereinabove, but in FIGS. 48 and 49 their rotations are represented by the linear movements in the horizontal direction for explanation. When the motors are rotated in the "forward direction", the switch actuating members 119a and 119b are displaced to the right while the switch actuating members 119aV and 119bV, to the left. On the other hand, when the motors are rotated in the "reverse" direction, the members 119a and 119b are displaced to the left while the members 119aV and 119bV, to the right.

When the pushbutton 4 is depressed in FIG. 48, both of the arm $H_{a4}$ and the upper end $V_{a1}$ are moved upwardly, but only the arm $H_{a4}$ pushes up the switch actuating member 119a, thereby actuating the switch SHf. Therefore, the motor is rotated in the "forward direction" so that the switch actuating members 119a and 119b are displaced to the right. In this case, the switch actuating member 119a is displaced while being held in its raised position by the arm $H_{a4}$. When both of the members 119a and 119b are moved to the positions indicated in FIG. 49 (a), the arm $H_{a4}$ which has been holding the member 119a in its raised position is released from the member 119a so that the switch SHf is opened. Thus the motor is stopped in this position and the elongated slot 22a of the transversely movable plate 22 (See FIG. 21) is located at the position corresponding to the aperture $A_{p4}$.

The sliding plates which have been moved to their raised positions remain in these positions, but are released upon depression of the next pushbutton. When the pushbutton 13 is depressed under the condition illustrated in FIG. 49 (a), both of the arm $H_{a3}$ and the upper end $V_{a3}$ are simultaneously moved upwardly so that the switch actuating members 119b and 119aV are caused to move upwardly, thereby actuating their correlated switches SHr and SVf. Upon actuation of the switch SRr, the motor 140(See FIG. 8) is reversed in direction so that the switch actuating members 119a and 119b are displaced to the left from the positions illustrated in FIG. 49 (a). Therefore, as shown in FIG. 49(b), the arm $H_{a3}$ is released from the switch actuating member 119b and the switch SHr is opened so that the reverse rotation of the motor 140 is topped. On the other hand, the raised switch actuating member 119aV is displaced from the position indicated in FIG. 49(a) to the left while the switch SVf is kept closed, and as shown in FIG. 49(b), when the upper end $V_{a3}$ is released from the switch actuating member 119aV, the member 119aV is lowered so that the switch SVf is opened. In this position, the elongated slot 22a of the transversely slidable plate 22 (See FIG. 21) is located at the position corresponding to the aperture column including the aperture $A_{p13}$, while the elongated slot 23a of the longitudinally or vertically slidable plate 23 is located at the position corresponding to the aperture row including the aperture $A_{p13}$, thereby providing an aperture $A_{p13}$ by the intersection of the elongated slots 23a and 22a. Thus, the 13th image upon the original is selected.

FIG. 48(c) shows the state when the pushbutton (25) is depressed. The arm Ha-5 and the upper end Va-5 are simultaneously moved upwardly so that the switch actuating members 119a and 119b are displaced to their rightmost positions while the switch actuating members 119aV and 119bV, to their leftmost positions, whereby the switches SHf and SVf are opened by the members 119a and 119aV respectively, thereby stopping both of the motors 140 and 142.

Referring to FIG. 29, when the pushbutton 25 is depressed so that the arm $H_{a5}$ as well as the upper end $V_{a5}$ are caused to move upwardly simultaneously, the switch actuating members 119a and 119aV actuate the switches SHf and SVf respectively so that the motors 140 and 142 are rotated in the "forward direction" in FIG. 8, thereby driving the drive shafts 107 and 99 in the directions indicated by the arrows. Therefore the transversely and vertically movable plates 22 and 23 are displaced to their limit positions from the positions shown in FIG. 8. In this case, the vertical shafts 174 and 183 drivingly connected to the drive shafts 107 and 99 respectively make about 4 rotations before the drive shafts stop so that the eccentric pins 176 and 184 make four rotations respectively, thereby intermittently rotating the switch actuating assemblies 187H and 187V four times. Therefore, when these assemblies are rotated through predetermined angles, the arm $H_{a5}$ and the upper end $V_{a5}$ are released from the members 119a and 119aV respectively. In the similar manner, when the pushbutton 13 is depressed under the condition shown in FIG. 29, the eccentric pins 176 and 184 are caused to make two rotations before they are stopped. Thus it is seen that the time when the eccentric pins 176 and 184 are stopped is the same as the time when the switch actuating members are released from one of the arms $H_{a1}$ to $H_{a5}$ and from one of the upper ends $V_{a1}$ to $V_{a5}$ respectively, but it is disadvantageous to stop the motors at the same time because of the following reasons. First, the positions of the arms $H_{a1}$ to $H_{a5}$ and the upper ends $V_{a1}$ to $V_{a5}$ must be determined with a higher degree of accuracy. Otherwise, the time when the motors stop will widely vary from time to time whenever the pushbuttons are depressed, so that the sliding plates for determining the position of an aperture are not stopped at the same positions all the time. For example, even if the positions of the arms $H_{a1}$ to $H_{a5}$ and the upper ends $V_{a1}$ to $V_{a5}$ are arranged with a desired degree of accuracy, the positions of the switch actuating assemblies 187H and 187V relative to their eccentric pins would be different between the case where the assemblies are rotated in the forward direction and then stopped and the case where the assemblies are rotated in the reverse direction and then stopped. This means that the position of the elongated slot 22a of the movable plate 22 is different between the case in which the transversely movable plate 22 is displaced from its leftmost position to the right and stopped at for example the position corresponding to the aperture $A_{p13}$ and the case in which the plate 22 is displaced to the left from its rightmost position and then stopped at the position corresponding to the aperture $A_{p13}$. The same is true for the vertically slidable plate 23.

When the positions at which the elongated slots 22a and 23a of the slidable plates 22 and 23 stop are deviated from time to time the opening 24 formed by the intersection of the two slots is deviated from the selected aperture, so that the selected aperture is closed or other apertures are opened in the worse case. One of the methods for eliminating the defect described above is to provide a suitable arrangement of the arms $H_{a1}$ to $H_{a5}$ and the upper ends $V_{a1}$ to $V_{a5}$ but since the switch actuating assemblies are rotated as described hereinabove, this is not preferable. Therefore the present invention provides means for retaining the switch actuating assembly in its operative position. Said means is adapted to prevent the switch actuating member from being dropped immediately after said member is released from an arm or the upper end, and is positioned in the vicinity of the switch actuating assembly. Thus, the aperture selecting sliding plates may be stopped at desired positions, with a higher degree of accuracy all the time.

This means will be described in more detail as to its construction and operation with reference to FIGS. 38 to 47 hereinafter. This operation retaining means is adapted to mount the switch actuating assembly upon the outer surface thereof and is rotatably mounted to the inner surface of the intermediate plate 196 by means of two pins 234 and 235. To the pin 234 is pivoted the upper end of a relatively long rocking lever 236 while to the pin 235 is pivoted the portion slightly spaced apart upwardly from the center of a relatively short arm 237. One end of a connecting rod 240 is pivotably mounted to the center of the rocking lever 236 by means of a pivot 238 while the other end of the rod 240 is pivotably mounted to the arm 237 at its upper end by means of a pivot 239, so that the rocking levers 236 and 237 are interconnected with each other. Thus, when the connecting rod 240 is displaced to the left in FIG. 45 by the cam to be described in more detail hereinafter, the rocking lever 236 rotates about the pivot 234 in the clockwise direction while the rocking lever 237, about the pivot 239 in the counterclockwise direction so that the lower ends of the rocking levers 236 and 237 are spaced apart from each other as best shown in FIG. 41. Hooks 241 and 242 are pivotably mounted to the lower ends of the rocking levers 236 and 237 respectively by means of pivots 243 and 244 in opposed relation with each other. The hook 241 has a tendency of rotating in the counterclockwise direction in FIG. 45 about the pivot 243 while hook 242, about the pivot 244 in the clockwise direction by means of springs (not shown). The rotation of these hooks 241 and 242 are limited since the inner surfaces of the hooks 236 and 237 abut against the inwardly bent portions 236a and 237a formed at the lower ends of the rocking levers 236 and 237 respectively (See FIG. 41). The portions of the rocking levers 236 and 237 mounting the hooks 241 and 242 are outwardly extended through an opening 245 formed through the intermediate plate 196 so that the leading end of the hook 241 is in opposed relation with the flange of the switch actuating member 119aV while the leading end of the hook 242 is in opposed relation with respect to the flange of the switch actuating member 119bV as best shown in FIG. 45. As shown in FIGS. 41 and 43, one ends of the springs 246 and 247 are mounted to the rocking levers 236 and 237 respectively while the other ends of these springs are mounted to the vertical shaft 174 so that the rocking lever 236 is biased to rotate in the counterclockwise direction while the rocking lever 237, in the clockwise direction.

As shown in FIG. 43, an engaging member 248 is fixed to the inner surface of the connecting rod 240 by means of two screws 249 having a head and has at its one end a bent portion 248a adapted to engage with a cam 186. The cam 186 has an egg-like configuration as best shown in FIG. 44 in plan view so that upon one rotation of the cam 186 the bent portion 248a is pushed to the right in FIG. 44, thereby displacing to the left in FIG. 45 the connecting rod 240 so as to move the rocking levers 236 and 237 away from each other.

By loosening the heads 249, the engaging member 248 may be displaced horizontally in FIG. 43 so that the bent portion 248a may be moved toward or away from the cam 186, thereby adjusting the displacement of the connecting rod 240 by the rotation of the cam 186. For example, when the bent portion 248a is located at the position nearest to the cam 186, the displacement of the connecting rod 240 is the largest while the bent portion 248a is moved away from the cam 186 to its extreme extent, and the displacement becomes the least. This means that the time when the projected portion 186a of the cam 186 engages with the bent portion 248a may be varied depending upon the adjusted position of the bent portion 248a. In other words, the time interval when the cam 186 keeps contact with the bent portion 248a may be varied depending upon the position of the bent portion 248a against the cam 186.

The switch actuating member 119aV is adapted to be moved upwardly by one of the slidable plates $V_1$ to $V_5$ (See FIG. 24). The cam 186 is normally stopped at the position where the cam 186 pushes the bent portion 248a to its leftmost position as shown in FIG. 41 when the image selection pushbutton is to be depressed, so that the hooks 241 and 242 are moved away from the switch actuating members.

When a selected button is depressed so that the switch actuating members are moved upwardly, the motors are rotated so that the vertical shaft 183 operatively connected to the drive shaft is rotated. Therefore, the projected portion 186a of the cam 186 carried by the vertical shaft 183 is moved away from the bent portion 248a. FIG. 45 shows the cam 186 rotated from the position shown in FIG. 44 in either direction substantially by 90° so that the projection portion 186a of the cam 186 is moved completely away from the bent portion 248a. When the connecting rod 240 is freed by the disengagement of the bent portion 248a from the cam 186, the rocking levers 236 and 237 are moved toward each other by the springs 246 and 247. Therefore, as shown in FIG. 45 the hooks 241 and 242 would engage with the flanges of the switch actuating members 119aV and 119bV. But since either of the actuating members 119aV or 119bV is already held in the raised position, either of the hooks is entered below the raised switch actuating member as shown in FIG. 46. For example, when the switch actuating member 119bV is held in its raised position as shown in FIG. 46, it actuates the switch SVr so that the motor 142 (See FIG. 8) is driven in the reversed direction, thereby rotating the switch actuating assembly 178V in the reversed direction. Thus, the switch actuating member 119bV is rotated in the counterclockwise direction when viewed from the top in FIG. 46 so that its lower end is released from the upper end $V_{a3}$. If there is not provided the hook 242, the switch actuating member 119bV would have immediately fallen, so that the switch would be opened. But in practice the hook 242 prevents the switch actuating member 119bV from falling so that the switch remains closed, thereby the motor is driven so as to rotate the cam 186. When the cam 186 pushes the bent portion 248a to the right as shown in FIG. 41, the rocking lever 237 is caused to rotate about the pivot 235 in the counterclockwise direction, so that the lower end 237a of the rocking lever 237 moves the hook 442. Thus, the hook 442 is released outwardly from the lower end of the switch actuating member 119aV. Therefore, the switch actuating member is permitted to move downwardly, thereby the switch is opened. The time when the hook 242 or 241 is released from the lower end of the switch actuating member, that is the time when the switch is opened so that the motor is stopped, is adjusted suitably by suitably adjusting the position of the engaging member 248 relative to the cam 186 as described hereinabove.

Referring to FIG. 29, when the upper end $V_{a3}$ is moved upwardly, the switch actuating member 119aV is rotated in the direction indicated by the arrow. Since the upper end $V_{a3}$ is released from the lower end surface of the switch actuating member 119aV when the member 119aV has passed through the upper end $V_{a2}$, the switch actuating assembly including the switch actuating member 119aV must be actuated intermittently twice. That is, the eccentric pin 184 (See FIG. 38) must rotate twice in order to drive the switch actuating assembly. In the similar manner, when the upper end $V_{a5}$ moves the switch actuating member 119aV upwardly, the eccentric pin 184 must rotate four times. When the eccentric pin 184 rotates several times, the cam 186 carried by the same shaft as that of the eccentric pin rotates the same number, so that the rocking levers 236 and 237 are reciprocated. Therefore, the hook 242 (See FIG. 46) is rotated by the lower end of the switch actuating member, so that the hook 242 is moved below and away from the lower end of the actuating member. But even when the hook 242 is moved away from the lower end of the switch actuating member 119bV(See FIG. 46), the switch actuating member 119bV is held in its raised position by one of the upper ends $V_{a1}$ to $V_{a5}$, so that the member 119bV rotates while sliding over the upper end held in its raised position. After the lower end surface of the member has released from the upper end, the switch actuating member 119bV is finally permitted to move downwardly by the rotating motion of the hook 242 caused by the initial action of the cam 186 for pushing the bent portion 248a to the left in the figure.

The operation retaining means for the switch actuating assembly that has been so far described is for the assembly 187V and the operation retaining means for the assembly 187H has the same construction and operation as that described hereinabove so that no description will be made further.

The above described operation retaining means for determining the time when the motor that is started by depression of one image selection pushbutton is stopped by the cam driven by said motor with a higher degree of accuracy, will bring about the remarkable advantage that both of the transversely and vertically movable plates 22 and 23 which are driven by said motor may be stopped at the correct positions determined by the above selected and depressed pushbutton.

Figure 20:
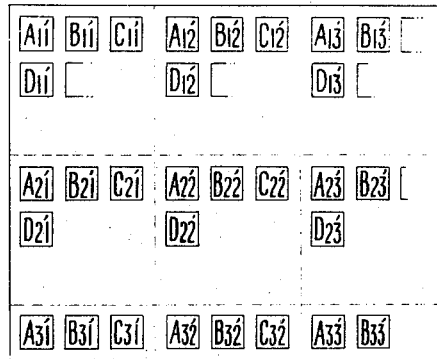
FIG. 20 is a schematic view of a sensitized material upon which are recorded a plurality of subjects as a multitude of split images.

Next the illumination system employed in the projector of the present invention will be described hereinafter. The system generally comprises the light source lamp 25, the movable mirror 20, the condenser lens 19 and the microlens plate 18. The original or negative or positive having recorded thereupon a plurality of images A'B'C'D', and so on by the compound photography is schematically shown in FIG. 20. The present invention will be described regarding to the case in which an arbitrarily selected image, for example, A' is selected by the image selection pushbutton and is projected upon the screen 6 (See FIG. 2 and 6). When the original 17 contains a number of N subjects, the image of one subject occupies 1/N of the whole area of the original, but in order to more clearly illustrate the split images recorded upon the original, the adjacent images are spaced apart from each other. When the ratio of the area actually recording the images to the whole area of the original is assumed to be $\eta$ ($\eta<1$, the area for recording the split images of one subject becomes ($1/N \times \eta$). Therefore, it will be seen that when the original is illuminated by the light source uniformly all over the surface thereof as in the case of the conventional color slide projection system, only $\eta/N$ of the illumination light will be utilized in order to illuminate the image A'. As described above, the instant embodiment $N = 25$ and $\eta = 0.6$, the actual intensity of the illumination light in the projector of the present invention must be $N/\eta (=41)$ times the intensity of the illumination light required for the conventional color slide projector.

The projection system of the compound photography is similar to that used in photography so that the projection light would be most effectively utilized when the projection light could be projected reversely along the optical path of the light used in photography.

Figure 17:
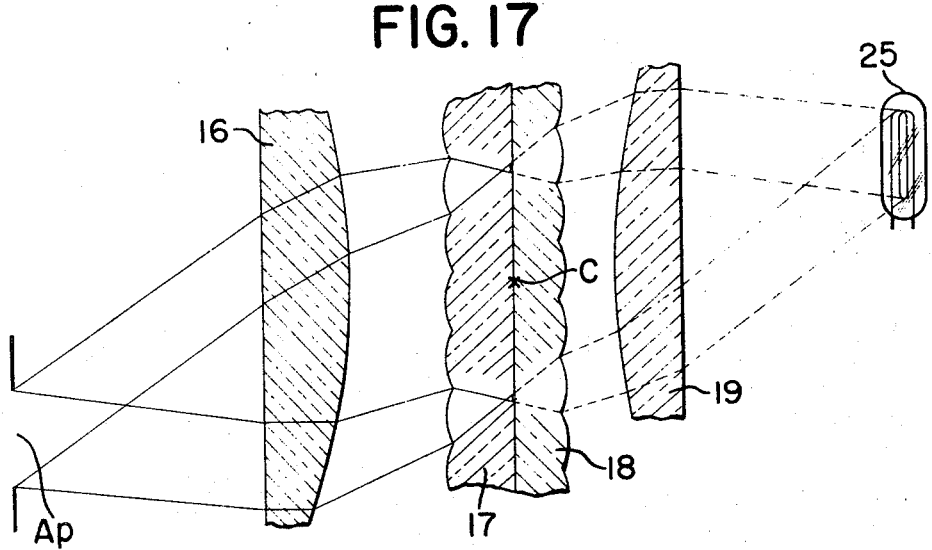
FIG. 17 is for explanation of the details of one portion of the projection optical system of the present invention.

For this purpose, in the instant embodiment, the optical system for projection shown in FIG. 17 is employed. The light source lamp 25 and the aperture Ap are located in symmetrical relation with each other with respect to the center C of the emulsion surface of the original 17. The position of the aperture Ap is varied depending upon the selected image so that the lamp 25 must be accordingly displaced in response to the displacement of the aperture in order to symmetrically locate the lamp 25 relative to the aperture as described above. However, it is very difficult to move horizontally and vertically the light source lamp 25 in response to the displacement of the aperture because of the mechanism therefor. Therefore, in the instant embodiment of the projection device of the present invention, the movable reflecting mirror 20 is moved instead of the lamp 25 in response to the displacement of the aperture Ap. As described hereinabove, the movable mirror 20 is rotated about both of the horizontal and vertical axes. That is, in FIG. 8 when the movable plate 22 is displaced in the direction indicated by the arrow, the rod extending from the movable mirror 20 is pushed by the knife edge 115a of the sliding plate 115, so that the mirror 20 is caused to rotate about the vertical axis. On the other hand, upon upward movement of the vertically slidable plate 23, the rod 114 is pushed up so that the movable mirror 20 is caused to rotate about the horizontal axis.

Figure 18:
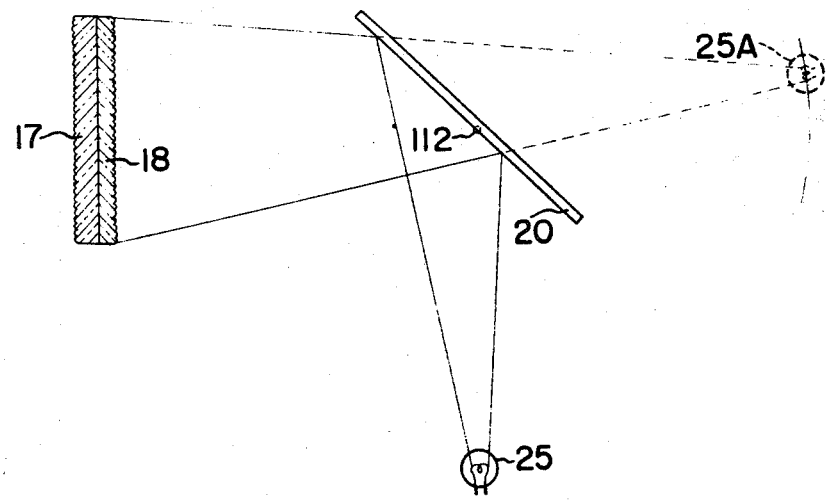
FIG. 18 is for explanation of a light source and illustrating the relative positions of the light source, a movable mirror and a microlens plate.

When the movable mirror 20 is rotated about both of the horizontal and vertical axes in response to the displacement of the aperture in the horizontal and vertical directions in response to the depression of the pushbutton for selection of an image to be projected, the displacement of the light source may be approximated. In this case, as shown in FIG. 18, the movement of the virtual image 25A of the light source lamp 25 becomes the circular movement, but when the distance between the planar mirror and the light source is sufficiently large, the error caused by the above circular movement of the virtual image 25A may be negligible.

For the purpose of more effective use of the light source, the thickness of the microlens 18 is made smaller than that of the original as shown in FIG. 17 and the projection or illumination light beams are converged after passing through the original 17 so that the loss of the projection light can be eliminated theoretically. In practice, however, there is a loss due to the diffusion by the emulsion surface as in the case of the conventional slide projection, so that the projector of the present invention may be regarded as the same as that of the conventional color projector in view of the area of an image to be projected, the brightness of the projection light source, the brightness of the projection screen when projected, etc. Therefore, in the present invention, a suitable conventional projection light source may be employed and the heat from the light source may be dissipated by well known technique, for example, by use of a fan 125 arranged at the back of the projection device for cooling the light source section.

In order to locate the aperture and the light source symmetrically with respect to the center C of the emulsion surface of the original so as to effectively utilize the projection light, the microlens plate 18 must be also displaced together with the light source in response to the displacement of the aperture or the selection of an image to be projected. The mechanism for displacing the microlens plate 18 in response to the selection of an image to be projected has been already described. That is, in FIG. 8 when the horizontally movable plate 22 is displaced in the direction indicated by the arrow by the shaft 107, the engaging member 94 is moved in the direction indicated by the arrow so as to move the square frame 83 mounting the microlens plate 18. Upon upward movement of the vertically movable plate 23 by the drive shaft 99, the engaging member 93 is moved downwardly, so that the "square" frame 83 is caused to move downwardly.

Referring back to FIG. 8, in order to translate the circular motion of the drive shaft 107 into the linear motion so as to transmit it to the engaging member 94, a worm 108 carried by the drive shaft 107 is in mesh with a worm wheel 103 which in turn is in mesh with another worm wheel 105. The worm wheels 103 and 105 are carried by threaded rods 102 and 104 respectively which are screw-threaded in the opposite directions with respect to each other. It is required that the microlens plate 18 must be moved a distance of about 0.2 mm when the movable plate 22 for selecting the aperture is moved by one step. But because of the arrangement of the above described worm, worm wheels and threaded rods, the fine movement of the microlens plate 18 may be accomplished with a higher degree of accuracy in a simple manner.

The tolerance will become very strict if it is desired that only one subject images are to be illuminated for projection. Therefore in the instant embodiment, the area to be illuminated is slightly enlarged while the "errors" caused by such illumination method may be eliminated. One method is to locate the light source in closely spaced relation with the microlenses, but in this method the light beams after passing through the images will be deviated from the desired optical paths, so that this method is not preferable. Another method is to make the light source larger as compared with the aperture. In this method the above described defects or errors may be minimized and in practice it is very easy to provide a light source lamp having an illumination area or light emitting area larger than that of an aperture of about 1 to 4 mm².

I claim:

1. A projector having an outer wall surface and adapted for projecting images formed by compound photography comprising
a first projection lens, said lens having an optical axis;
a first plate having an aperture therein movable in a plane perpendicular to said optical axis;
a developed original comprising a second lens consisting of a plurality of microlenses having a plurality of images formed thereon, said original spaced from said first lens along said optical axis;
a holder adapted to have said original detachably mounted thereon, said holder having an inner side facing said first lens and an outer side remote from said first lens;
a second plate having an aperture movable in a plane perpendicular to said optical axis;
said movable plates being located adjacent to said first lens;
an illumination means located on said remote side of said original holder for illuminating said original;
a projection screen upon which is projected an enlarged image of said original;
an image selection assembly located upon said outer wall surface of said projector for adjusting the positions of said movable plate apertures with respect to each other so as to select an image to be projected;
a microlens plate disposed adjacent said original on the remote side of said holder for illumination of said original;
a pair of drive shafts;
means for supporting said microlens plate and having connections to said drive shafts for movement by a small distance in both horizontal and vertical directions;
said movement of said microlens plate being in response to rotation of said drive shafts;
a movable mirror spaced from said microlens plate;
means for supporting said movable mirror for rotation about both of the horizontal and vertical axes;
means for rotating said movable mirror about both of the horizontal and vertical axes in response to the rotation of said drive shafts; and
a light source disposed on one side of said movable mirror, whereby said movable mirror is so rotated and said microlens plate is so moved that the position of the image selected by said image selection assembly and an image of said light source may be symmetrically located with respect to the center of said original.

2. A projector as set forth in claim 1 comprises
said pair of aperture selection movable plates which are slidable in directions perpendicular relative to each other and each of which has an elongated slot formed therethrough at a right angle relative to the direction of slidable movement thereof;
a pair of reversible motors having electrical circuits for selectively driving each said drive shaft in both forward and reverse directions;
change-over switches interconnected in the circuits of said motors for reversing the directions of rotations of said motors;
means for actuating said switches so as to rotate said motors in such direction that said pair of movable plates may be moved to an aperture position selected by said image selection assembly;
means for holding said switches in closed positions; and
means operatively coupled to said drive shafts for opening said switches when each of said apertures is located at said selected position.

3. A projector as set forth in claim 1 comprises
said pair of aperture selection movable plates which are slidable in directions perpendicular relative to each other and each of which has an elongated slot formed therethrough at a right angle relative to the direction of the slidable movement thereof;
a pair of reversible motors having electrical circuits for selectively driving said drive shafts in both forward and reverse directions;
change-over switches interconnected in the circuits of said pair of motors for reversing the directions of rotation of said motors;
means for actuating said switches so as to rotate said motors in such a direction that said pair of movable plates may be moved to an aperture position selected by said image selection assembly;
means for holding said switches in closed positions;
means operatively coupled to said drive shafts for opening said switches when each of said apertures is located at said selected position;
a cam carried by a further shaft coupled to each of said drive shafts; and
an engaging member movably mounted on said switch operation holding means and adapted to be moved by said cam when said switch is opened, said engaging member being adapted to be adjustably positioned relative to said cam, thereby adjusting the timing of opening said switch.

* * * * *